US012404139B2

(12) United States Patent
Vegliante

(10) Patent No.: US 12,404,139 B2
(45) Date of Patent: Sep. 2, 2025

(54) PLASTIC WRAP CONTAINER

(71) Applicant: Cutting Edge Packaging Solutions, LLC, Sarasota, FL (US)

(72) Inventor: Paul Vegliante, Sarasota, FL (US)

(73) Assignee: Cutting Edge Packaging Solutions, Inc., Sarasota, FL (US)

( * ) Notice: Subject to any disclaimer, the term of this patent is extended or adjusted under 35 U.S.C. 154(b) by 0 days.

(21) Appl. No.: 18/416,705

(22) Filed: Jan. 18, 2024

(65) Prior Publication Data

US 2024/0199311 A1 Jun. 20, 2024

Related U.S. Application Data

(63) Continuation of application No. 17/530,876, filed on Nov. 19, 2021, now abandoned, which is a continuation of application No. 15/358,816, filed on Nov. 22, 2016, now abandoned.

(51) Int. Cl.

| | |
|---|---|
| ***B65H 35/00*** | (2006.01) |
| ***B26D 1/06*** | (2006.01) |
| ***B65D 5/16*** | (2006.01) |
| ***B65D 83/08*** | (2006.01) |

(52) U.S. Cl.

CPC ......... *B65H 35/0086* (2013.01); *B26D 1/065* (2013.01); *B65D 5/16* (2013.01); *B65D 83/0841* (2013.01); *B65H 35/002* (2013.01); *B65H 2301/51512* (2013.01); *B65H 2701/1944* (2013.01)

(58) Field of Classification Search

CPC .. B65D 83/0882; B65D 83/0841; B65D 5/16; B26D 1/065; B65H 35/002; B65H 35/0086; B65H 2301/51512; B65H 2701/1944

USPC ............... 206/225, 226; 221/30–32; 242/562

See application file for complete search history.

(56) References Cited

U.S. PATENT DOCUMENTS

| | | | |
|---|---|---|---|
| 1,827,029 | A | 10/1931 | Marcalus |
| 2,115,891 | A | 5/1938 | Tishler |
| 2,118,380 | A | 5/1938 | Gresenz |
| 2,713,939 | A | 7/1955 | Lear |

(Continued)

FOREIGN PATENT DOCUMENTS

| | | | |
|---|---|---|---|
| CA | 2156643 | A1 | 2/1997 |
| EP | 1475027 | A2 | 11/2004 |

(Continued)

OTHER PUBLICATIONS

Decision on Appeal mailed May 3, 2022, issued in connection with U.S. Appl. No. 15/358,816 (9 pages).

(Continued)

*Primary Examiner* — Phong H Nguyen

(74) *Attorney, Agent, or Firm* — McCarter & English, LLP

(57) ABSTRACT

A wrap container having a body including a front wall, a rear wall, a top wall, and a bottom wall forming an enclosure. A roll of wrap is disposed within the enclosure. The top wall has a perforated section. A folding surface has a top surface and a bottom surface with a cutter assembly including a track and a slidable cutter attached to the bottom surface of the folding surface. The cutter assembly has a first retracted position in the enclosure and a second deployed positon folded out of the opening.

14 Claims, 22 Drawing Sheets

(56) References Cited

U.S. PATENT DOCUMENTS

| | | | | | |
|---|---|---|---|---|---|
| 2,743,009 | A * | 4/1956 | Williamson | B65D 85/672 229/175 |
| 3,071,034 | A | 1/1963 | Castelli | |
| 3,079,827 | A | 3/1963 | Catelli | |
| 3,153,853 | A | 10/1964 | Lipton | |
| 3,165,283 | A | 1/1965 | Kaiser et al. | |
| 3,301,117 | A | 1/1967 | Spaulding | |
| 3,477,624 | A * | 11/1969 | Harshbarger | B65D 83/0841 225/80 |
| 3,549,066 | A | 12/1970 | Wankow | |
| 3,561,312 | A | 2/1971 | Jones | |
| 3,974,947 | A * | 8/1976 | Budny | B65D 83/0841 225/53 |
| 4,104,108 | A | 8/1978 | Kishida et al. | |
| 4,156,382 | A | 5/1979 | Baker | |
| 4,197,774 | A | 4/1980 | Singh et al. | |
| D255,779 | S | 7/1980 | Clatterbuck | |
| 4,210,043 | A | 7/1980 | Urion et al. | |
| 4,238,065 | A * | 12/1980 | Ragsdale | B65D 85/672 225/48 |
| 4,340,162 | A | 7/1982 | Heiman et al. | |
| 4,346,829 | A | 8/1982 | Myers | |
| 4,417,495 | A | 11/1983 | Gordon et al. | |
| 4,586,639 | A | 5/1986 | Ruff et al. | |
| 4,699,031 | A | 10/1987 | D'Angelo et al. | |
| D293,211 | S | 12/1987 | DePaul et al. | |
| 4,960,022 | A | 10/1990 | Chuang | |
| 5,292,046 | A | 3/1994 | Kaiser et al. | |
| D347,345 | S | 5/1994 | Kaiser et al. | |
| 5,322,001 | A | 6/1994 | Boda | |
| 5,440,961 | A | 8/1995 | Lucas, Jr. et al. | |
| 5,658,179 | A | 8/1997 | Glydon et al. | |
| 5,772,094 | A | 6/1998 | Kaiser et al. | |
| D396,978 | S | 8/1998 | Kaiser et al. | |
| 5,802,942 | A | 9/1998 | Cornell et al. | |
| 5,936,652 | A | 8/1999 | Narayan et al. | |
| 5,941,476 | A | 8/1999 | Copass | |
| 6,223,639 | B1 | 5/2001 | Chen | |
| 6,269,970 | B1 | 8/2001 | Huang et al. | |
| D447,685 | S | 9/2001 | Chagnon et al. | |
| D504,314 | S | 4/2005 | Kim | |
| 6,931,974 | B2 | 8/2005 | Tseng | |
| D540,187 | S | 4/2007 | Duffy | |
| 7,299,731 | B2 | 11/2007 | Schulz | |
| 7,406,904 | B2 | 8/2008 | Antal et al. | |
| 7,603,937 | B2 | 10/2009 | Pavlik et al. | |
| 7,845,261 | B2 | 12/2010 | Chiang | |
| 7,918,151 | B2 | 4/2011 | Vegliante et al. | |
| 7,921,756 | B2 | 4/2011 | Vegliante et al. | |
| D643,747 | S | 8/2011 | Rye et al. | |
| 7,987,758 | B2 | 8/2011 | Chabansky | |
| D700,837 | S | 3/2014 | Antal, Sr. | |
| 8,684,228 | B2 | 4/2014 | Parker | |
| D727,170 | S | 4/2015 | Lokey et al. | |
| D728,258 | S | 5/2015 | Cohen | |
| D778,149 | S | 2/2017 | Frick | |
| 9,604,382 | B2 | 3/2017 | Vegliante et al. | |
| D787,324 | S | 5/2017 | Sotka | |
| D787,931 | S | 5/2017 | Beck et al. | |
| D815,522 | S | 4/2018 | Vegliante | |
| D873,659 | S | 1/2020 | Vegliante | |
| 10,836,558 | B2 | 11/2020 | Vegliante | |
| 10,894,688 | B2 | 1/2021 | Vegliante | |
| 10,959,580 | B2 | 3/2021 | Vegliante | |
| 11,407,580 | B2 | 8/2022 | Vegliante | |
| 11,634,295 | B2 | 4/2023 | Vegliante | |
| 2002/0023526 | A1 | 2/2002 | Vegliante et al. | |
| 2002/0056785 | A1 | 5/2002 | Newman et al. | |
| 2002/0096031 | A1 | 7/2002 | Yang | |
| 2002/0117038 | A1 | 8/2002 | Vegliante et al. | |
| 2003/0127352 | A1 | 7/2003 | Buschkiel et al. | |
| 2003/0140760 | A1 | 7/2003 | Bory | |
| 2004/0040429 | A1 * | 3/2004 | Nichols | B65H 35/0086 83/614 |
| 2004/0237746 | A1 | 12/2004 | Schultz et al. | |
| 2005/0005755 | A1 | 1/2005 | Turvey et al. | |
| 2005/0034585 | A1 | 2/2005 | Antal | |
| 2005/0035133 | A1 | 2/2005 | Gerulski et al. | |
| 2005/0166738 | A1 | 8/2005 | Hsu | |
| 2005/0223863 | A1 | 10/2005 | Volfson et al. | |
| 2006/0156885 | A1 | 7/2006 | Wu | |
| 2006/0202079 | A1 | 9/2006 | Pavlik | |
| 2006/0237579 | A1 | 10/2006 | Doubleday et al. | |
| 2007/0000935 | A1 * | 1/2007 | Pavlik | B65H 16/005 221/33 |
| 2007/0004598 | A1 | 1/2007 | Maeda | |
| 2007/0044617 | A1 | 3/2007 | Pavlik | |
| 2007/0125214 | A1 | 6/2007 | Dong et al. | |
| 2007/0173394 | A1 | 7/2007 | Lee | |
| 2008/0005882 | A1 | 1/2008 | Kaiser et al. | |
| 2008/0073371 | A1 | 3/2008 | Neiberger et al. | |
| 2008/0142379 | A1 | 6/2008 | Gnatenko | |
| 2009/0188366 | A1 | 7/2009 | Habra et al. | |
| 2010/0032445 | A1 | 2/2010 | Bunoz | |
| 2010/0168685 | A1 | 7/2010 | Drown | |
| 2011/0209594 | A1 | 9/2011 | Withers | |
| 2011/0214544 | A1 | 9/2011 | Vegliante et al. | |
| 2012/0267387 | A1 | 10/2012 | Omdoll et al. | |
| 2014/0096659 | A1 | 4/2014 | Choi | |
| 2015/0203313 | A1 | 7/2015 | Kaiser | |
| 2015/0239615 | A1 | 8/2015 | O'Donnell et al. | |
| 2015/0344256 | A1 | 12/2015 | Kaiser et al. | |
| 2016/0051330 | A1 | 2/2016 | Cosentino, II | |
| 2017/0151687 | A1 | 6/2017 | Vegliante et al. | |
| 2018/0141742 | A1 | 5/2018 | Vegliante | |
| 2018/0141743 | A1 | 5/2018 | Vegliante | |
| 2019/0167047 | A1 | 6/2019 | Vegliante | |
| 2019/0168985 | A1 | 6/2019 | Vegliante | |
| 2020/0011114 | A1 | 1/2020 | Gerstein | |
| 2020/0087099 | A1 | 3/2020 | Vegliante et al. | |
| 2020/0208073 | A1 | 7/2020 | Nowak et al. | |
| 2020/0283254 | A1 | 9/2020 | Vegliante et al. | |
| 2021/0139266 | A1 | 5/2021 | Vegliante | |
| 2021/0214150 | A1 | 7/2021 | Vegliante | |
| 2022/0073263 | A1 | 3/2022 | Vegliante | |
| 2022/0194734 | A1 | 6/2022 | Vegliante et al. | |
| 2023/0056530 | A1 | 2/2023 | Vegliante et al. | |
| 2023/0257226 | A1 | 8/2023 | Vegliante | |
| 2024/0279019 | A1 | 8/2024 | Vegliante | |

FOREIGN PATENT DOCUMENTS

| | | | |
|---|---|---|---|
| FR | 2895985 | A1 | 7/2007 |
| JP | 1086937 | | 4/1998 |
| JP | 200131077 | A | 2/2001 |
| KR | 19980068958 | U | 12/1998 |
| KR | 200153428 | Y1 | 8/1999 |
| KR | 200169841 | Y1 | 2/2000 |
| KR | 20100010691 | U | 11/2010 |
| KR | 200458830 | Y1 | 2/2012 |
| KR | 20130010454 | A | 1/2013 |
| KR | 20130135058 | A | 12/2013 |
| KR | 200473478 | Y1 | 7/2014 |
| KR | 20140089688 | A | 7/2014 |
| KR | 20160033516 | A | 3/2016 |
| KR | 101907354 | B1 | 10/2018 |

OTHER PUBLICATIONS

Office Action mailed Sep. 18, 2023, issued in connection with U.S. Appl. No. 17/530,876 (11 pages).

Office Action mailed Oct. 10, 2023, issued in connection with U.S. Appl. No. 16/689,059 (14 pages).

Office Action mailed Nov. 15, 2023, issued in connection with U.S. Appl. No. 18/138,430 (9 pages).

Office Action mailed Apr. 19, 2024, issued in connection with U.S. Appl. No. 16/689,059 (12 pages).

Office Action dated Nov. 29, 2024, issued in connection with U.S. Appl. No. 18/652,091 (10 pages).

Office Action mailed Dec. 17, 2024, issued in connection with U.S. Appl. No. 16/689,059 (11 pages).

(56) References Cited

OTHER PUBLICATIONS

Applicant-Initiated Interview Summary mailed Feb. 3, 2025, issued in connection with U.S. Appl. No. 16/689,059 (3 pages).
Plastic Wrap Dipenser Saran Wrap Cutter [online] Published on Oct. 14, 2014 from URL: https://wowbeli.com/plastic-wrap-dispenser-saran-wrap-cutter-poly-bags-cling-film-food-storage-containers-kitchen-accessories-supplies-products/ (8 pages).
Plastic Wrap Dispenser by ChicWrap [online] Retrieved Oct. 16, 2017 from URL: https://www.everythingkitchens.com/chicwrap-plastic-wrap-dispenser-modern-silver-dots-9914.html?utm_source=google&utm_medium=cse&utem_term=9914&gclid=EAlalQobChMI0_O9wZf11glVil6GCh1OXQCdEAQYCCABEgK_zPD-BwE (5 pages).
Office Action mailed Oct. 30, 2017, issued in connection with U.S. Appl. No. 29/585,274 (6 pages).
Notice of Allowance mailed Dec. 19, 2017, issued in connection with U.S. Appl. No. 29/585,274 (5 pages).
International Search Report of the International Searching Authority mailed on Jan. 30, 2018, issued in connection with International Application No. PCT/US2017/062770 (3 pages).
Written Opinion of the International Searching Authority mailed on Jan. 30, 2018, issued in connection with International Application No. PCT/US2017/062770 (8 pages).
Office Action mailed Mar. 4, 2019, issued in connection with U.S. Appl. No. 15/832,953 (16 pages).
Written Opinion of the International Searching Authority mailed on Feb. 26, 2019, issued in connection with International Application No. PCT/US2018/64234 (4 pages).
Search Report of the International Searching Authority mailed on Feb. 26, 2019, issued in connection with International Application No. PCT/US2018/64234 (3 pages).
International Search Report of the International Searching Authority mailed on Feb. 27, 2019, issued in connection with International Application No. PCT/US2018/64241 (3 pages).
Written Opinion of the International Searching Authority mailed on Feb. 27, 2019, issued in connection with International Application No. PCT/US2018/64241 (9 pages).
Office Action mailed May 28, 2019, issued in connection with U.S. Appl. No. 15/832,989 (16 pages).
Office Action mailed Jun. 5, 2019, issued in connection with U.S. Appl. No. 15/399,863 (9 pages).
Office Action mailed Jun. 5, 2019, issued in connection with U.S. Appl. No. 15/358,816 (7 pages).
Applicant-Initiated Interview Summary mailed Jun. 12, 2019, issued in connection with U.S. Appl. No. 15/832,953 (9 pages).
Office Action mailed Oct. 24, 2019, issued in connection with U.S. Appl. No. 15/358,816 (8 pages).
Office Action mailed Nov. 21, 2019, issued in connection with U.S. Appl. No. 15/832,953 (20 pages).
Notice of Allowance mailed Sep. 20, 2019, issued in connection with U.S. Appl. No. 29/656,548 (11 pages).
Applicant-Initiated Interview Summary mailed Nov. 12, 2019, issued in connection with U.S. Appl. No. 15/358,816 (2 pages).
Office Action mailed Dec. 6, 2019, issued in connection with U.S. Appl. No. 15/832,989 (16 pages).
Office Action mailed Dec. 19, 2019, issued in connection with U.S. Appl. No. 15/358, 816 (7 pages).
Office Action mailed Dec. 20, 2019, issued in connection with U.S. Appl. No. 15/399,863 (9 pages).
Examiner-Initiated Interview Summary mailed Dec. 19, 2019, issued in connection with U.S. Appl. No. 15/399,863 (3 pages).
Office Action mailed Jul. 10, 2020, issued in connection with U.S. Appl. No. 15/832,989 (17 pages).
Office Action mailed Jul. 10, 2020, issued in connection with U.S. Appl. No. 15/358,816 (10 pages).
Notice of Allowance mailed Aug. 25, 2020, issued in connection with U.S. Appl. No. 15/399,863 (7 pages).
Examiner-Initiated Interview Summary mailed Sep. 25, 2020, issued in connection with U.S. Appl. No. 15/832,953 (1 page).
Notice of Allowance mailed Sep. 25, 2020, issued in connection with U.S. Appl. No. 15/832,953 (10 pages).
Office Action mailed Jan. 7, 2021, issued in connection with U.S. Appl. No. 15/358,816 (9 pages).
Notice of Allowance mailed Dec. 22, 2020, issued in connection with U.S. Appl. No. 15/832,989 (11 pages).
Office Action mailed Sep. 23, 2021, issued in connection with U.S. Appl. No. 17/152,590 (11 pages).
Office Action mailed Nov. 12, 2021, issued in connection with U.S. Appl. No. 16/825,783 (12 pages).
Office Action mailed Dec. 17, 2021, issued in connection with U.S. Appl. No. 16/689,059 (15 pages).
Office Action mailed Oct. 8, 2021, issued in connection with U.S. Appl. No. 17/218,055 (7 pages).
Notice of Allowance mailed Mar. 28, 2022, issued in connection with U.S. Appl. No. 17/218,055 (8 pages).
Office Action mailed Jun. 1, 2022, issued in connection with U.S. Appl. No. 16/825,783 (14 pages).
Applicant-Initiated Interview Summary mailed Jun. 30, 2022, issued in connection with U.S. Appl. No. 16/825,783 (2 pages).
Office Action mailed Jul. 1, 2022, issued in connection with U.S. Appl. No. 17/152,590 (8 pages).
Office Action mailed Sep. 20, 2022, issued in connection with U.S. Appl. No. 17/530,876 (6 pages).
Office Action mailed Oct. 5, 2022, issued in connection with U.S. Appl. No. 16/689,059 (16 pages).
Notice of Allowance mailed Nov. 18, 2022, issued in connection with U.S. Appl. No. 17/152,590 (7 pages).
Notice of Allowance mailed Nov. 21, 2022, issued in connection with U.S. Appl. No. 16/825,783 (7 pages).
Applicant-Initiated Interview Summary mailed Dec. 19, 2022, issued in connection with U.S. Appl. No. 17/530,876 (2 pages).
Notice of Allowance mailed Feb. 13, 2023, issued in connection with U.S. Appl. No. 17/152,590 (7 pages).
Office Action mailed Feb. 17, 2023, issued in connection with U.S. Appl. No. 17/530,876 (8 pages).
Notice of Allowance mailed Feb. 27, 2023, issued in connection with U.S. Appl. No. 16/825,783 (7 pages).
Office Action mailed Mar. 16, 2023, issued in connection with U.S. Appl. No. 16/689,059 (20 pages).
Office Action mailed May 16, 2023, issued in connection with U.S. Appl. No. 17/981,199 (15 pages).
International Search Report of the International Searching Authority mailed on Jul. 21, 2023, issued in connection with International Application No. PCT/US2023/15018 (6 pages).
Written Opinion of the International Searching Authority mailed on Jul. 21, 2023, issued in connection with International Application No. PCT/US2023/15018 (9 pages).

* cited by examiner

PLASTIC WRAP CONTAINER

CROSS-REFERENCE TO RELATED APPLICATIONS

This application is a continuation of, and claims priority to, U.S. patent application Ser. No. 17/530,876 filed on Nov. 19, 2021, which is a continuation of U.S. patent application Ser. No. 15/358,816 filed on Nov. 22, 2016, the entire disclosures of which are expressly incorporated herein by reference.

TECHNICAL FIELD

The present disclosure relates to a plastic wrap container and, in particular, to a plastic wrap container including a cutter assembly that is recessed and protected from damage during storage or transport of the plastic wrap container.

BACKGROUND

Plastic wrap is used in both commercial and residential settings to cover and protect food until future use. In the commercial setting, a roll of plastic wrap is generally mounted to a dispenser that includes an assembly for cutting the plastic wrap. For residential settings, a roll of plastic wrap is generally packaged in an elongated box, these boxes being stacked on top of each other for shipping or storage. Due to stacking of the boxes, the assembly for cutting the plastic wrap can be in the form of a serrated edge exposed when the box is opened. Some residential plastic wrap boxes include a sliding cutter inside the box which can be attached to the outside of the box after the box has been opened. However, users may not be aware that the cutter is provided inside the box, and this requires the user to perform extra steps in attaching the cutter to the box which can result in an unstable position of the cutter.

Thus, a need exists for a plastic wrap container which includes a cutter assembly mounted to the outside of the box in such a way that the cutter assembly is not damaged during shipping or storage. This and other needs are addressed by the plastic wrap containers of the present disclosure.

SUMMARY

In accordance with some embodiments of the present disclosure, an exemplary plastic wrap container is provided. The plastic wrap container includes a body and a cutter assembly attached to the body. The body includes a front wall, a rear wall, a top wall, and a bottom wall. A connection between the front wall and the top wall can define a first corner of the body. A connection between the front wall and the bottom wall can define a second corner of the body. A connection between the rear wall and the top wall can define a third corner of the body. A connection between the rear wall and the bottom wall can define a fourth corner of the body. The first corner can include a recessed area including a first surface (e.g., a vertical surface) and a second surface (e.g., a horizontal surface).

The cutter assembly can be attached to either the first surface or second surface of the recessed area. In some embodiments, the cutter assembly can be attached to an outer surface of either the first surface or the second surface of the recessed area. In some embodiments, the cutter assembly can be attached to an inner surface of either the first surface or the second surface of the recessed area, and the recessed area can be flipped outwardly to expose the cutter assembly for use. Positioning of the cutter assembly in the recessed area advantageously allows multiple plastic wrap containers to be stacked for shipping or storage, while preventing application of force on the cutter assembly by the surrounding plastic wrap containers. The lack of force on the cutter assembly during shipping or storage prevents damage to the cutter assembly.

In some embodiments, the body can be formed from a foldable blank including a plurality of perforated lines or fold lines. The blank can form the body of the plastic wrap container when the blank is in a folded configuration. The connection between the front wall and the bottom wall, the connection between the rear wall and the top wall, and the connection between the rear wall and the bottom wall can form a substantially right angle. The connection between the first surface of the recessed area and the top wall can form a substantially right angle, and the first surface can extend substantially parallel to the front wall of the body. A connection between the second surface of the recessed area and the front wall can form a substantially right angle, and the second surface can extend substantially parallel to the top wall of the body.

The recessed area can be dimensioned such that when the cutter assembly is attached to the first surface, the cutter assembly does not extend beyond planes defined by the top wall and the front wall of the body. The recessed area can be dimensioned such that when the cutter assembly is attached to the second surface, the cutter assembly does not extend beyond planes defined by the top wall and the front wall of the body. The first and second surfaces of the recessed area can be configured to be positioned in a recessed configuration and an extended configuration.

In the recessed configuration, the first surface extends at an angle (e.g., a substantially right angle) relative to the top wall of the body and the second surface extends at an angle (e.g., a substantially right angle) relative to the front wall of the body to form an inwardly directed corner. In the extended configuration, the first surface extends in a substantially aligned manner relative to the top wall of the body (e.g., substantially aligned with the plane defined by the top wall) and the second surface extends in a substantially aligned manner relative to the front wall of the body (e.g., substantially aligned with the plane defined by the front wall) to form a substantially right angle between the first surface and the second surface.

The body can include first and second side walls each connected to the front, rear, top and bottom walls. In one embodiment, the first and second side walls each include a perforated section adjacent to the recessed area. The perforated section can be configured to be at least partially separated from the respective first and second side walls to access an inner surface of the first and second surfaces of the recessed area for positioning the recessed area in the extended position. In particular, the perforated sections can be used to form openings in the respective first and second side walls to receive one or more fingers of the user to pop out or flip out the recessed area into the extended position.

The front, rear, top, bottom, first side, and second side walls form an enclosure within the body. The enclosure can be configured and dimensioned to receive therein a roll of plastic wrap. In one embodiment, the roll of plastic wrap can be mounted to the first and second side walls of the body such that the roll of plastic wrap axially rotates within the enclosure as plastic wrap is being dispensed out of the body. In one embodiment, the plastic wrap container can include a perforated section in the top wall of the body. The perforated section can be configured to be at least partially separated from the top wall to form an opening for accessing and extending the plastic wrap from the enclosure.

In another embodiment, the plastic wrap container can include a perforated section extending across a portion of the top wall and a portion of the first surface of the recessed area (e.g., extending across the corner formed between the top wall and the first surface). The perforated section can be configured to be at least partially separated from the top wall and the first surface to form an opening for accessing and extending plastic wrap from an enclosure formed by the body. In some embodiments, the cutter assembly can include a track and a slidable cutter secured to the track. The track can be glued or welded to the first surface or second surface of the recessed area.

In accordance with embodiments of the present disclosure, an exemplary plastic wrap container system is provided that includes a plastic wrap container. The plastic wrap container includes a body and a cutter assembly attached to the body (e.g., an outer surface or inner surface of the body). The body includes a front wall, a rear wall, a top wall, and a bottom wall. The front, rear, top and bottom walls form an enclosure within the body. A connection between the front wall and the top wall can define a first corner of the body. A connection between the front wall and the bottom wall can define a second corner of the body. A connection between the rear wall and the top wall can define a third corner of the body. A connection between the rear wall and the bottom wall can define a fourth corner of the body. The first corner can include a recessed area including a first surface (e.g., a vertical surface) and a second surface (e.g., a horizontal surface). The cutter assembly can be attached to either the outer surface or the inner surface of the first surface or second surface of the recessed area. The system includes a roll of plastic wrap disposed within the enclosure of the body. The roll of plastic wrap can be configured to axially rotate within the enclosure.

In accordance with embodiments of the present disclosure, an exemplary method of dispensing plastic wrap is provided. The method includes providing a plastic wrap container. The plastic wrap container includes a body and a cutter assembly attached to the body. The body includes a front wall, a rear wall, a top wall, and a bottom wall. A connection between the front wall and the top wall can define a first corner of the body. A connection between the front wall and the bottom wall can define a second corner of the body. A connection between the rear wall and the top wall can define a third corner of the body. A connection between the rear wall and the bottom wall can define a fourth corner of the body.

The first corner can include a recessed area including a first surface (e.g., a vertical surface) and a second surface (e.g., a horizontal surface). The cutter assembly can be attached to either the first surface or second surface of the recessed area. The method includes positioning a roll of plastic wrap within the enclosure of the body. The roll of plastic wrap can be configured to axially rotate within the enclosure. The method includes dispensing the plastic wrap from an opening in the body. In one embodiment, the method includes positioning the first and second surfaces of the recessed area in a recessed configuration and an extended configuration.

In accordance with another embodiment of the present disclosure, an exemplary plastic wrap container having a deployable cutter assembly is provided. The plastic wrap container includes a body having a front wall, a rear wall, a top wall, and a bottom wall. The body further includes first and second side walls connected to edges of the front, rear, top, and bottom walls. The front, rear, top, and bottom walls and the first and second side walls form an enclosure within the body that is configured and dimensioned to receive a roll of plastic wrap. A feature for maintaining the position of the plastic roller could be disposed on at least one inner face of the sidewalls.

The container includes a perforated section formed in and extending along a partial length of one of the walls of the body, for example, the top wall. The perforated section can be configured to be at least partially separated from the top wall to form an opening for dispensing the plastic wrap from the enclosure.

In accordance with embodiments of the present disclosure, the container further includes a cutter assembly attached to the body. The cutter assembly is attached to the bottom surface of a folding section positioned within the container, and includes an elongated track and a slidable cutter with an internal blade or serrated edge. The slidable cutter travels along the track to cut the plastic wrap positioned over the track. In exemplary embodiments, the cutter assembly can be positioned in a retracted configuration and a deployed configuration. In the retracted configuration the cutter assembly is positioned within the container, thereby protecting the cutter assembly from damage during shipping or storage of the container. Due to the recessed positioning of the cutter assembly in the retracted configuration, the exterior of the container is not impacted and multiple containers can be stacked relative to each other without imparting pressure or force on the cutter assembly, thereby preventing potential damage to the cutter assembly.

In accordance with some embodiments of the present disclosure, the perforated section can be at least partially removed by the user to form the opening in the top wall of the container and thereby revealing the folding section. The opening in the top wall formed by removing perforated section is sized such that the folding section can be folded to extend therethrough. To deploy the cutter assembly attached to the bottom surface of the folding section, the user can urge or bend a first portion the of folding section about a perforated or scored line, thereby rotating the first portion out through the opening and positioning the cutter assembly into a deployed configuration.

In accordance with embodiments of the present disclosure, the end of the plastic wrap can be dispensed through the opening until the desired length of the plastic wrap is achieved. The plastic wrap can be positioned over the track of the cutter assembly and the cutter can be slid across the track to sever an individual sheet of plastic wrap from the remaining plastic wrap. After use of the container, the cutter assembly remain in the deployed configuration or can be repositioned into the retracted configuration if the user plans on storing or stacking items on top of the container.

In accordance with some embodiments of the present disclosure, the folding section is attached to an upper support wall disposed beneath the top wall of the container. The folding section can be attached to the upper support wall with adhesive, welding, or any other attachment means known to those of ordinary skill in the art. The folding section could also be formed integrally with the container In accordance with embodiments of the present disclosure, an exemplary method for positioning the cutter assembly into the deployed configuration. The method includes the following steps: providing a plastic wrap container; at least partially removing a perforated section from the top wall of the body of the container, thereby providing an opening or aperture in the top wall; and bending a first portion of a folding section out through the opening to deploy the cutter assembly.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed plastic wrap container, reference is made to the accompanying figures, wherein.

DESCRIPTION OF EXEMPLARY EMBODIMENTS

It should be understood that the relative terminology used herein, such as "front", "rear," "left," "top," "bottom," "vertical," and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

Figure 1:
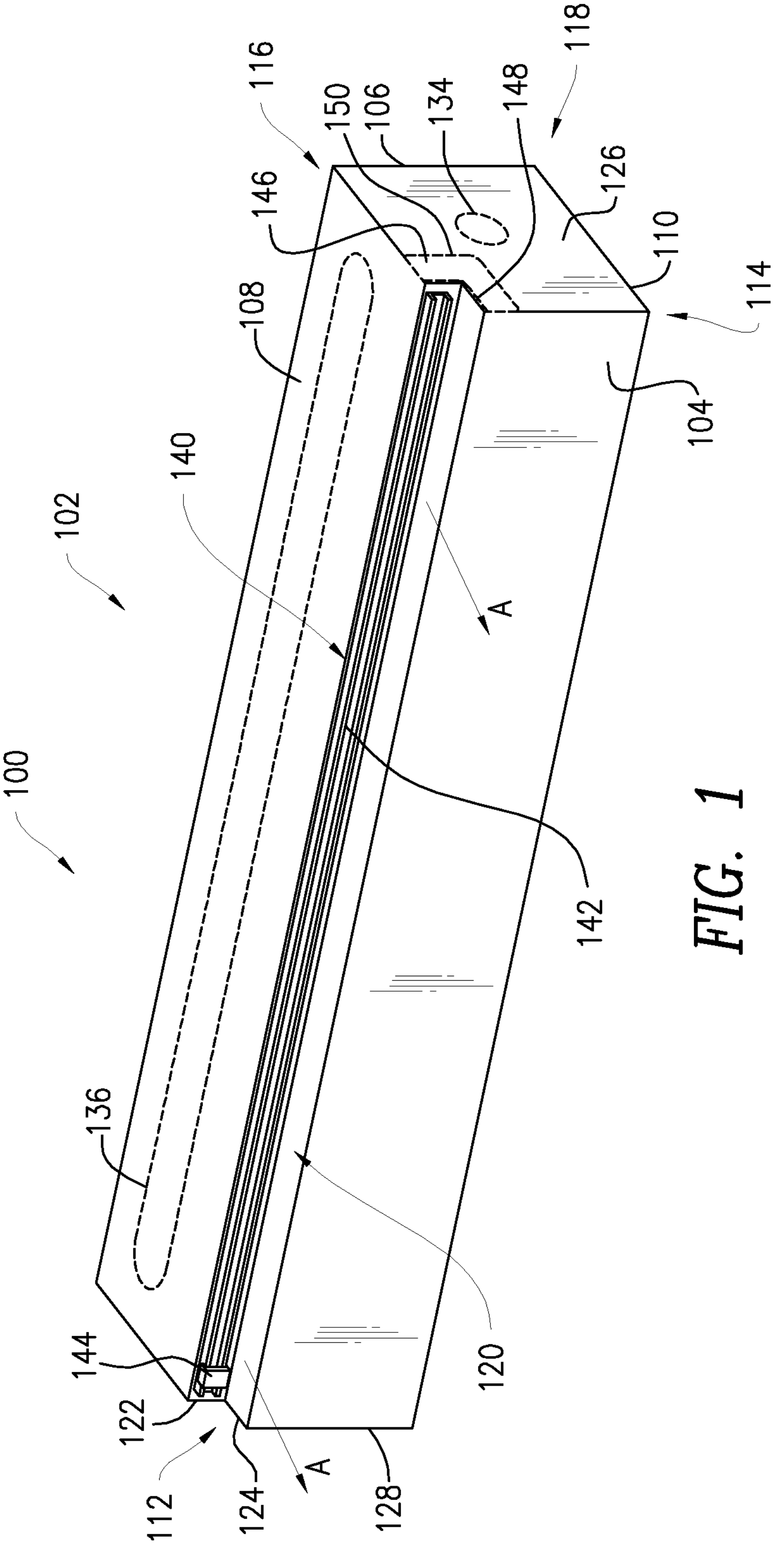
FIG. 1 is a perspective view of a first embodiment of an exemplary plastic wrap container including a recessed area in a recessed configuration according to the present disclosure.

Turning to FIG. 1, a perspective view of a first embodiment of an exemplary plastic wrap container 100 (hereinafter "container 100") is provided. The container 100 includes a body 102 including a front wall 104, a rear wall 106, a top wall 108 and a bottom wall 110. Although illustrated as having four walls forming a substantially square configuration, it should be understood that the four walls can form a rectangular configuration or the body 102 can include more than four walls. The body 102 can be formed from a blank (see, e.g., FIG. 13) having multiple perforated lines or fold lines for folding the blank into the configuration shown in FIG. 1.

The connections between the walls of the body 102 can be at the perforated lines or fold lines of the blank. The connection between the front wall 104 and the top wall 108 defines a first corner 112 of the body 102. The connection between the front wall 104 and the bottom wall 110 defines a second corner 114 of the body 102. A connection between the rear wall 106 and the top wall 108 defines a third corner 116 of the body 102. A connection between the rear wall 106 and the bottom wall 110 defines a fourth corner 118 of the body 102. The second corner 114, third corner 116 and fourth corner 118 can form substantially right angles by the connections between the respective walls.

In contrast, the first corner 112 includes a recessed area 120 forming an inverted or inwardly directed corner. The recessed area 120 includes a first wall or surface 122 (e.g., a vertically oriented wall) and a second wall or surface 124 (e.g., a horizontally oriented wall). The connection between the first surface 122 of the recessed area 120 and the top wall 108 can define a substantially right angle (e.g., the first surface 122 extends substantially parallel to the front wall 104 and perpendicular to the top wall 108). The connection between the second surface 124 of the recessed area 120 and the front wall 104 can define a substantially right angle (e.g., the second surface 124 extends substantially parallel to the top wall 108 and perpendicular to the front wall 104).

The connection between the first and second surfaces 122, 124 defines a substantially right angle. In some embodiments, the distance by which the first and second surfaces 122, 124 extend inwardly towards each other can be dimensioned equal. In some embodiments, the distance by which the first and second surfaces 122, 124 extend inwardly towards each other can be dimensioned differently. For example, the depth of the first surface 122 can be dimensioned greater than the depth of the second surface 124. As a further example, the depth of the second surface 124 can be dimensioned greater than the depth of the first surface 122.

The body 102 includes first and second side walls 126, 128 each connected to side edges of the front, rear, top and bottom walls 104-110 to define a plurality of lateral corners on opposing sides of the body 102. The connection between the first and second side walls 126, 128 and the front, rear, top and bottom walls 104-110 define a substantially right angle. The front, rear, top and bottom walls 104-110 and the first and second side walls 126, 128 form an enclosure 130 within the body 102 configured and dimensioned to receive a roll of plastic wrap 132 (see, e.g., FIG. 2). An inner surface of the first and second side walls 126, 128 can include a feature 134 (feature on second side wall 128 not visible). In one embodiment, the feature 134 can be in the form of a perforated or partially perforated section configured to be pushed into the enclosure 130 to maintain the position of the roll of plastic wrap 132 within the enclosure 130. The location of the feature 134 defines the approximate axis of rotation for the roll of plastic wrap 132. In another embodiment, the feature 134 can be in the form of an extension mounted to the inner surface of the first and second side walls 126, 128 configured to engage and maintain the position of the roll of plastic wrap 132 within the enclosure 130.

The container 100 includes a perforated section 136 (e.g., an elongated section with a preperforated perimeter) formed in and extending along a partial length of one of the walls of the body 102 (e.g., the top wall 108). The perforated section 136 can be configured to be at least partially separated from the top wall 108 to form an opening 138 for dispensing the plastic wrap 132 from the enclosure 130 (see, e.g., FIG. 5). The container 100 further includes a cutter assembly 140 attached to the body 102. In the embodiment shown in FIG. 1, the cutter assembly 140 is attached to the first surface 122 of the recessed area 120. However, it should be understood that the cutter assembly 140 can similarly be attached to the second surface 124 of the recessed area. The cutter assembly 140 includes an elongated track 142 and a slidable cutter 144 with an internal blade or serrated edge. The track 142 can be attached to the first surface 122 with adhesive or by welding, and the slidable cutter 144 travels along the track 142 to cut the plastic wrap 132 positioned over the track 142.

Figure 2:
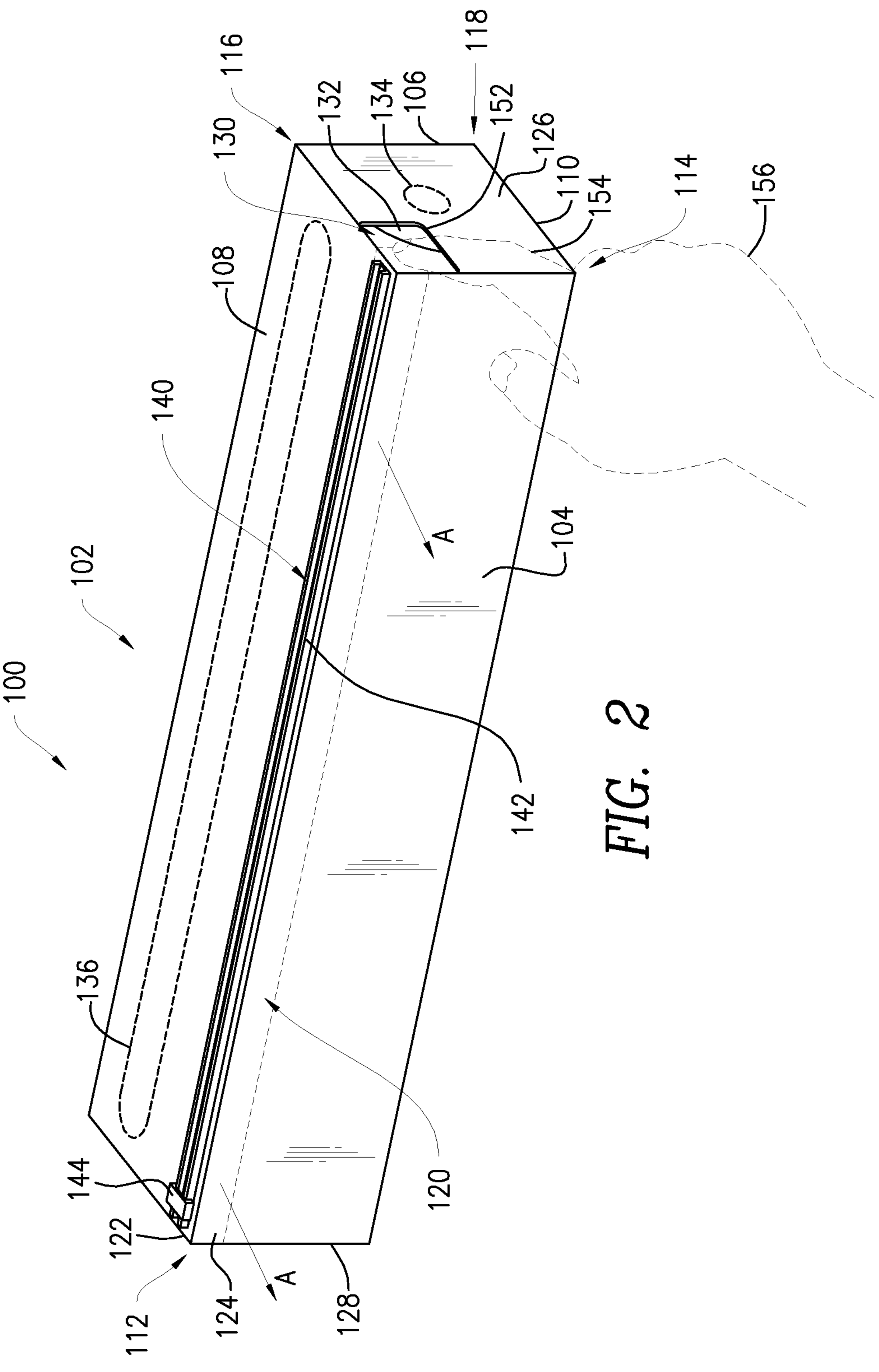
FIG. 2 is a perspective view of an exemplary plastic wrap container of FIG. 1 including a recessed area in an extended configuration.
Figure 3:
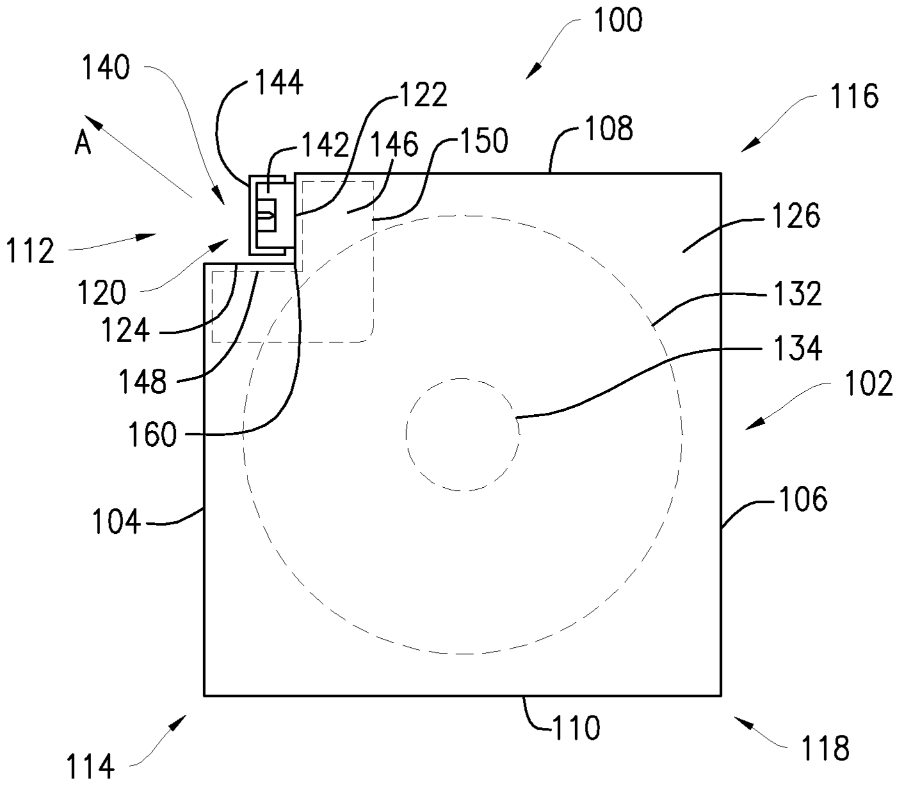
FIG. 3 is a side view of an exemplary plastic wrap container of FIG. 1 including a recessed area in a recessed configuration.
Figure 4:
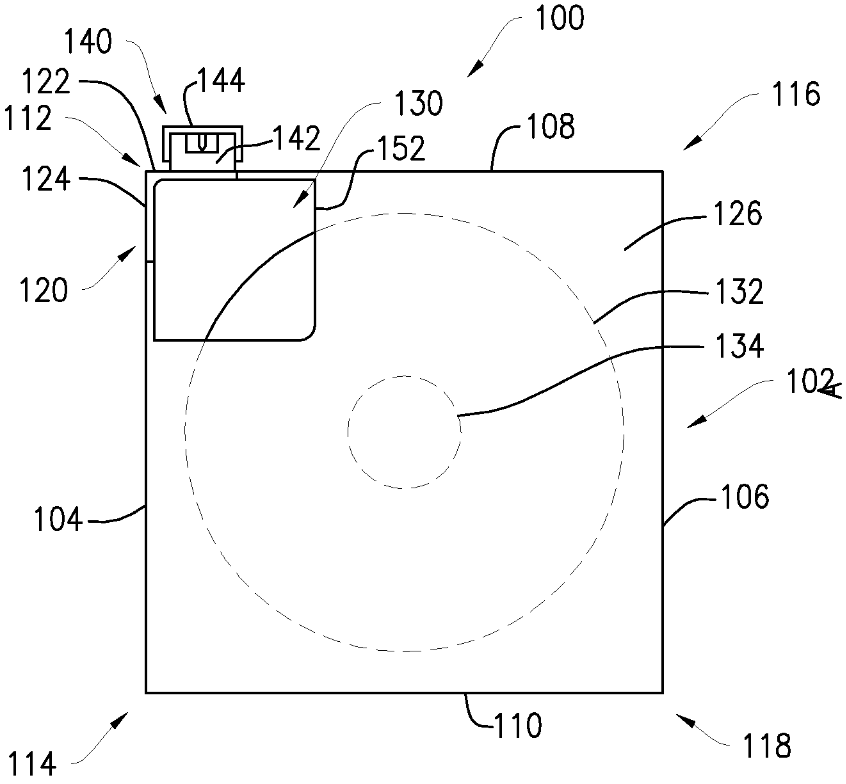
FIG. 4 is a side view of an exemplary plastic wrap container of FIG. 1 including a recessed area in an extended configuration.

The first and second surfaces 122, 124 of the recessed area 120 can be configured to be positioned in a recessed configuration and an extended configuration. FIGS. 1 and 3 show the recessed area 120 in the recessed configuration, while FIGS. 2 and 4 show the recessed area in the extended configuration. In the recessed configuration, the recessed area 120 defines an inverted or inwardly facing corner for protection of the cutter assembly 140 during shipping or storage of the container 100. In particular, the recessed area 120 is configured such that when the cutter assembly 140 is attached to the first surface 122, the cutter assembly 140 does not extend beyond planes defined by the top wall 108 and the front wall 104. Similarly, the recessed area 120 is configured such that when the cutter assembly 140 is attached to the second surface 124, the cutter assembly 140 also does not extend beyond planes defined by the top wall 108 and the front wall 104. Due to the recessed positioning of the cutter assembly 140, multiple containers 100 can be stacked relative to each other without imparting pressure or force on the cutter assembly 140, thereby preventing potential damage to the cutter assembly 140.

In the embodiment of FIGS. 1 and 3, the cutter assembly 140 is substantially perpendicular relative to the top wall 108. As will be discussed in greater detail below, the recessed area 120 can be flipped outwardly by a user into the extended configuration for positioning the cutter assembly 140 in an orientation substantially parallel with the top wall 108. In particular, in the recessed configuration, the first surface 122 extends at an angle (e.g., a right angle) relative to the top wall 108 and the second surface 124 extends at an angle (e.g., a right angle) relative to the front wall 104 to form an inwardly directed corner. In the recessed configuration, the side profile of the container 100 defines right angles at the second, third and fourth corners 114-118, while defining the inwardly directed first corner 112. In the extended configuration, the first surface 122 can extend in a substantially aligned manner relative to the top wall 108 and the second surface can extend in a substantially aligned manner relative to the front wall 104 to form an outwardly facing corner with a substantially right angle between the first and second surfaces 122, 124. In the extended configuration, the side profile of the container 100 defines right angles at each of the first, second, third and fourth corners 112-118.

The first and second side walls 126, 128 each include a perforated section 146 (e.g., a section with a preperforated perimeter) disposed adjacent to the recessed area 120. Although not visible in FIG. 1, it should be understood that the second side wall 128 includes a substantially similar perforated section 146. In one embodiment, the perforated section 146 can define a substantially L-shaped configuration as shown in FIG. 1. In other embodiments, the perforated section 146 can include an inner edge 148 defining a substantially right angle corresponding to the shape of the recessed area 120 and an outer edge 150 defining a rounded or arcuate profile.

The perforated section 146 can be at least partially removed by the user (e.g., cut or punched out, pushed into the enclosure 130, or the like) to form an opening 152 in each of the first and second side walls 126, 128 (see, e.g., FIG. 2). The openings 152 are configured and dimensioned to partially receive one or more fingers 154 of a user's hand 156 such that the fingers 154 can be used to flip, bias or push the recessed area 120 from the recessed configuration into the extended configuration. For example, the user can urge the first and second surfaces 122, 124 of the recessed area 120 outward as indicated by arrows A to convert the first and second surfaces 122, 124 of the recessed area 120 into the extended configuration. In some embodiments, applying a force on the first and second surfaces 122, 124 in the opposite direction indicated by arrows A can urge the recessed area 120 from the extended configuration into the recessed configuration for storage of the container 100.

Thus, as shown in FIGS. 1 and 3, in the recessed configuration, the cutter assembly 140 fits within the recessed area 120 without extending beyond the top wall 108 or the front wall 104. As shown in FIGS. 2 and 4, in the extended configuration, the cutter assembly 140 is repositioned to point substantially aligned with the top wall 108. In the recessed configuration, the inner corner 160 formed by the connection of the first and second surfaces 122, 124 is spaced from the plastic wrap 132. In some embodiments, the side profile of the container 100 can be rectangular and the plastic wrap 132 can be mounted within the enclosure 130 at a position offset from a central point of the container 100. In such embodiments, a roll of plastic wrap 132 with a bigger diameter can be disposed within the container 100 (e.g., the sides of the plastic wrap 132 extending positioned immediately adjacent to the inner walls of the container 100) without interfering with the inner corner 160 of the recessed area 120.

In some embodiments, rather than attaching the cutter assembly 140 to an outer surface of the recessed area 120 (e.g., the surface of the recessed area 120 facing away from the enclosure 130) the cutter assembly 140 can be attached to an inner surface of the recessed area 120. For example, the cutter assembly 140 can be attached to either the inner surface of the first surface 122 or the second surface 124 (e.g., initially disposed within the enclosure 130). In such embodiments, the recessed area 120 can be disconnected from the body 102 at the perforated line connecting the first surface 122 to the top wall 108 or the perforated line connecting the second surface 124 to the front wall 104, or the first and second surfaces 122, 124 can be disconnected from each other along the connecting perforated line. After separation along one of the perforated lines, the cutter assembly 140 can be flipped outward from the enclosure 130 for use. After use, the cutter assembly 140 can be flipped back into the enclosure 130 for storage.

Figure 5:
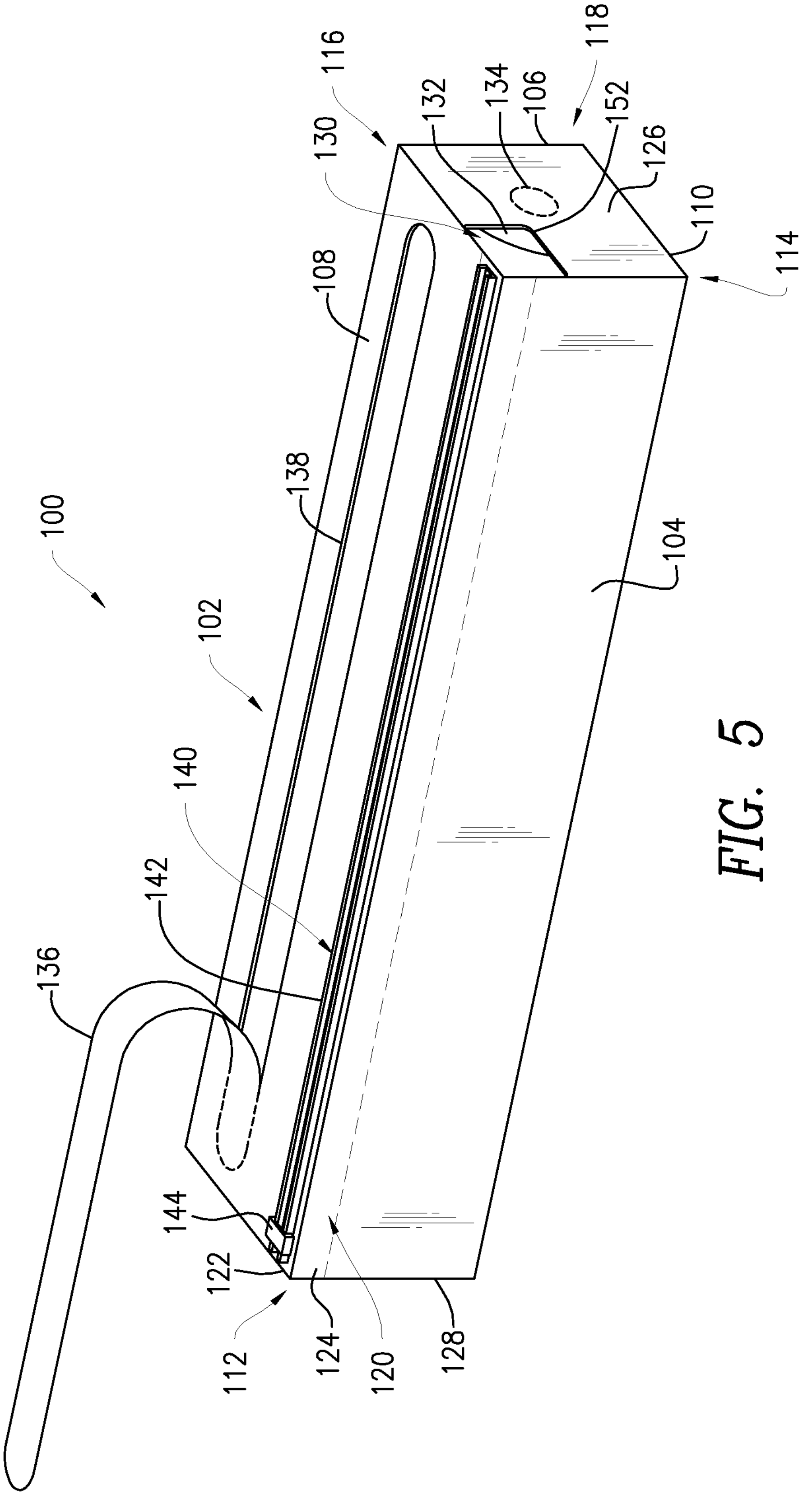
FIG. 5 is a perspective view of an exemplary plastic wrap container of FIG. 1 including a recessed area in an extended configuration and a partially removed perforated section.
Figure 6:
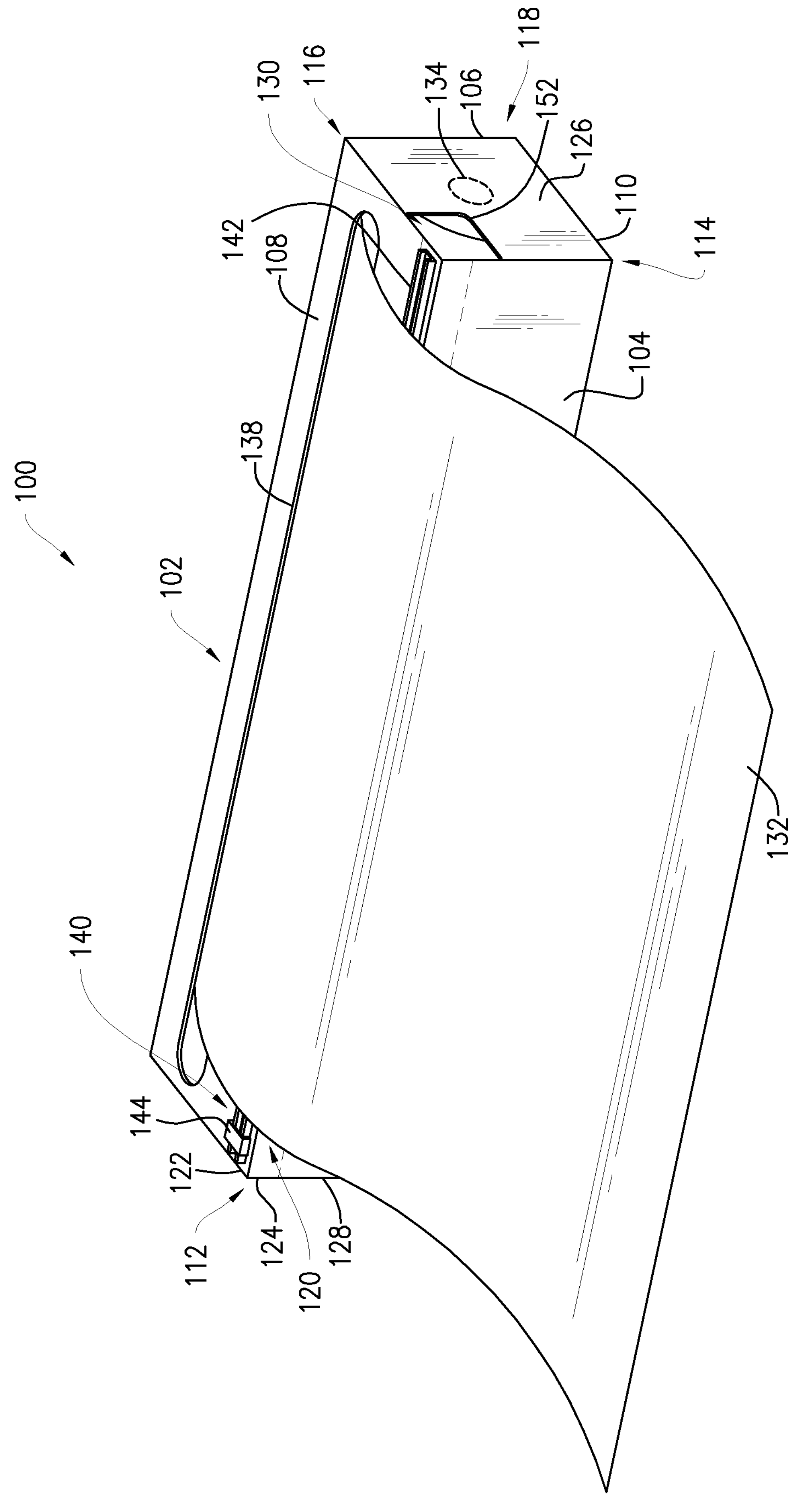
FIG. 6 is a perspective view of an exemplary plastic wrap container of FIG. 1 including a recessed area in an extended configuration and plastic wrap dispensed from an opening.
Figure 7:
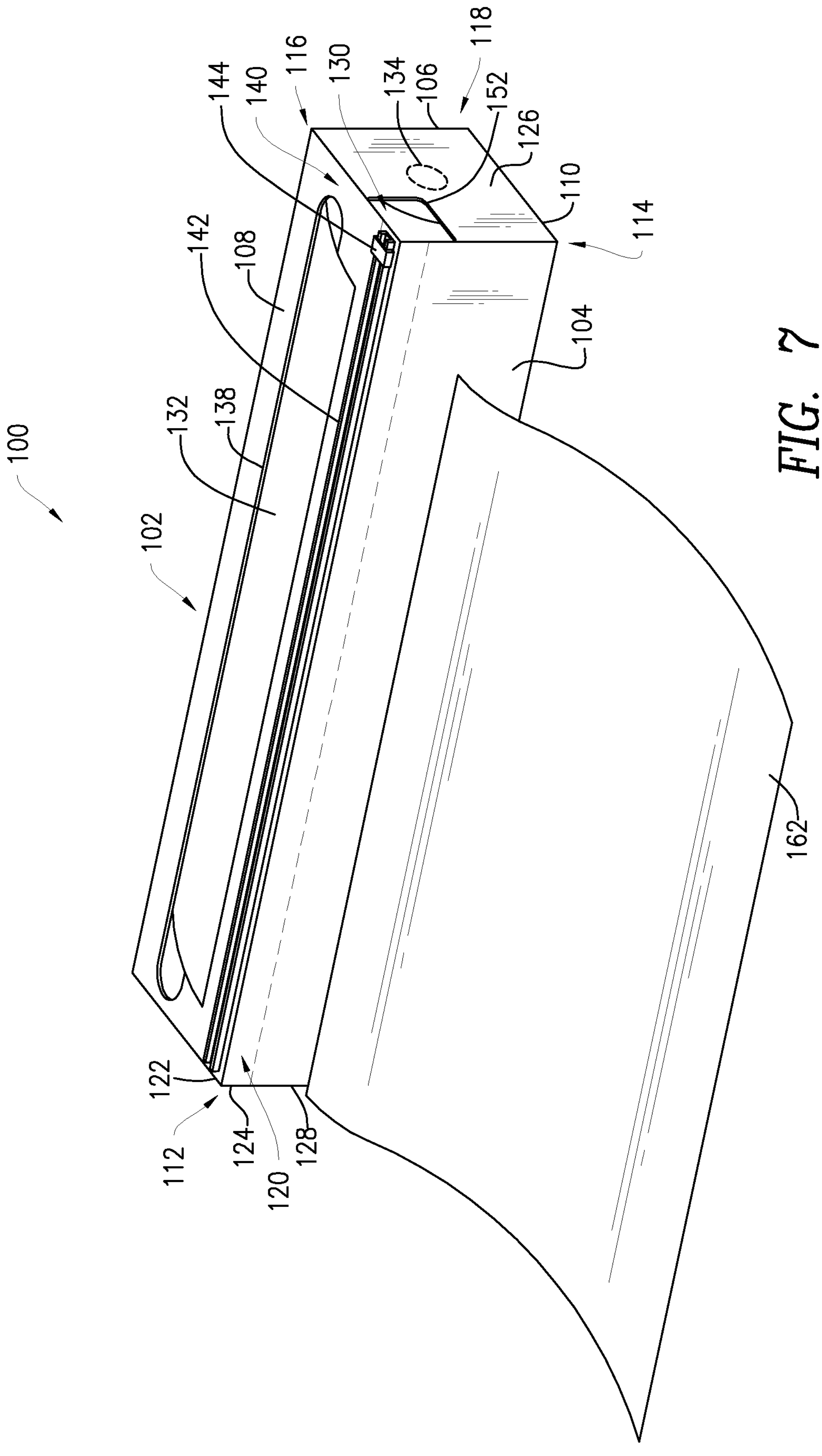
FIG. 7 is a perspective view of an exemplary plastic wrap container of FIG. 1 including a recessed area in an extended configuration, plastic wrap dispensed from an opening, and a section of the plastic wrap cut by a cutter assembly.
Figure 8:
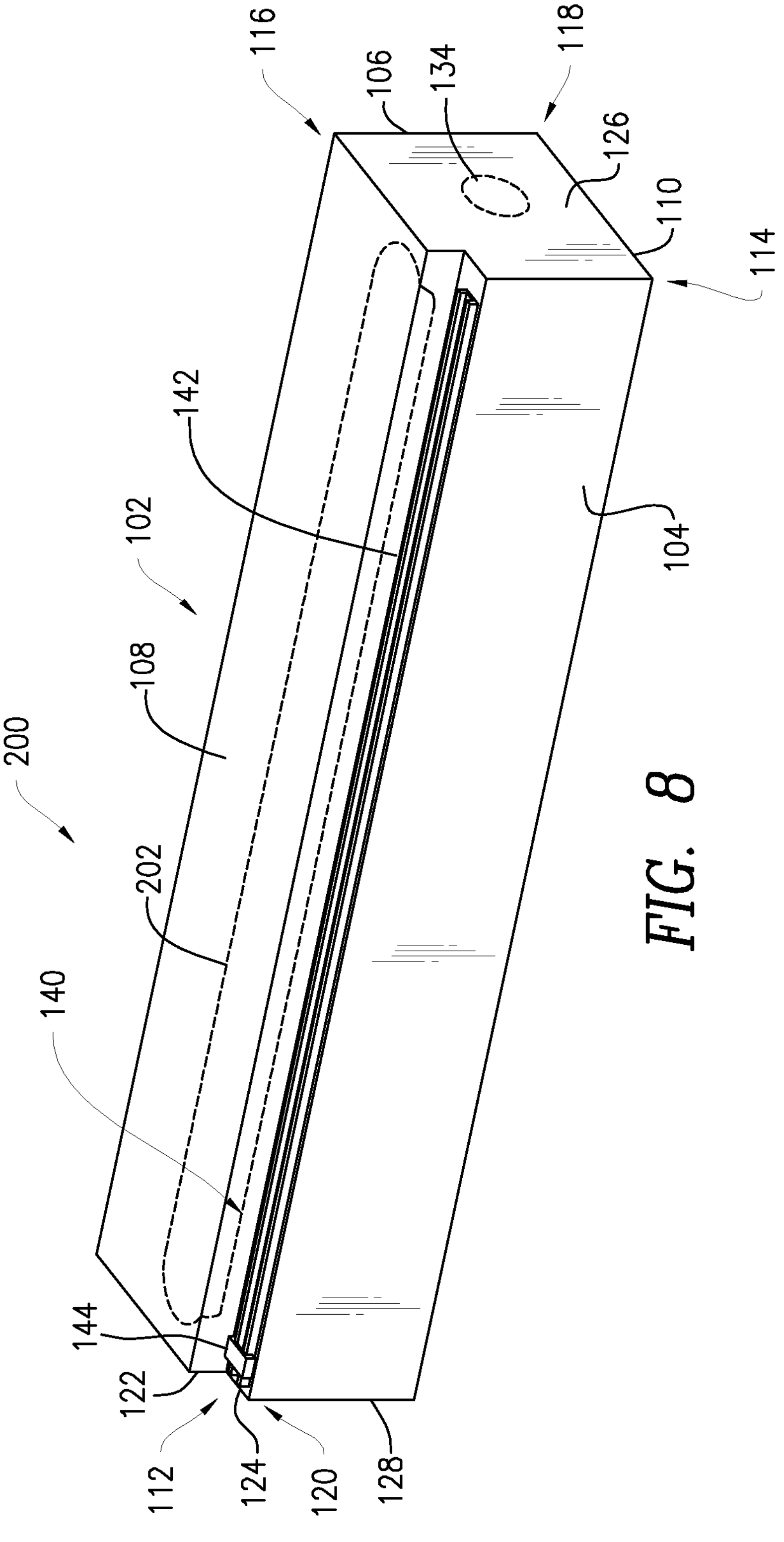
FIG. 8 is a perspective view of a second embodiment of an exemplary plastic wrap container including a recessed area in a recessed configuration according to the present disclosure.
Figure 9:
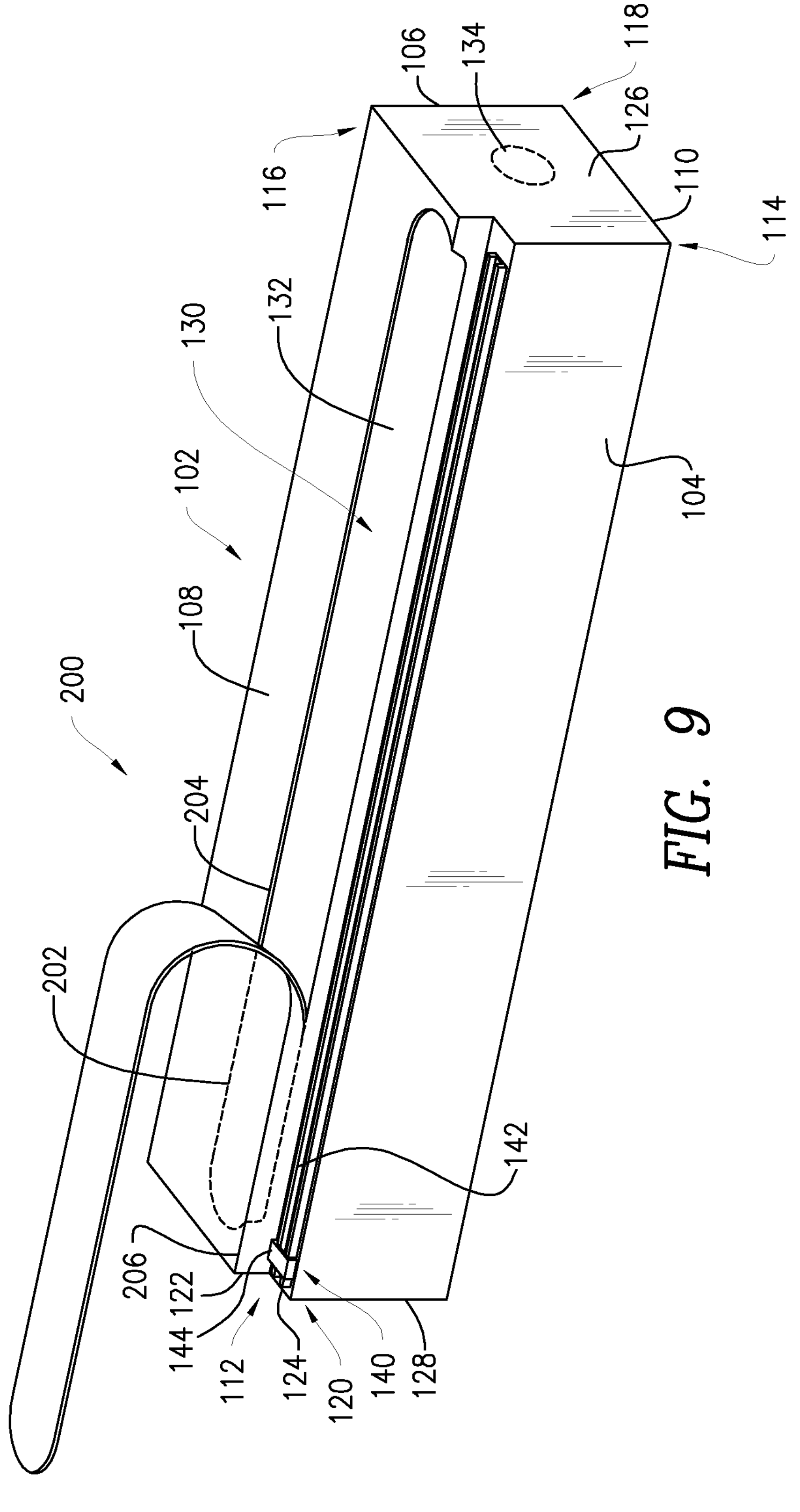
FIG. 9 is a perspective view of an exemplary plastic wrap container of FIG. 8 including a recessed area in a recessed configuration and a partially removed perforated section.

FIGS. 5-7 show perspective views of the container 100 with the perforated section 136 partially removed and fully removed for extension of the plastic wrap 132 through the opening 138. In particular, after the recessed area 120 has been positioned in the extended configuration, the perforated section 136 can be at least partially removed from the top wall 108 to expose the opening 138. Although illustrated as fully removed in FIGS. 6 and 7, in some embodiments, one end of the perforated section 136 can remain attached to the top wall 108 and acts as a flap used to close the opening 138 after the desired plastic wrap 132 has been dispensed.

After the perforated section 136 has been removed, the end of the plastic wrap 132 can be dispensed through the opening 138 until the desired length of the plastic wrap 132 is achieved. The plastic wrap 132 can be positioned over the track 142 of the cutter assembly 140 as shown in FIG. 6, and the cutter 144 can be slid across the track 142 to sever the individual sheet of plastic wrap 162 from the remaining plastic wrap 132. After use of the container 100, the recessed area 120 can remain in the extended configuration or can be repositioned into the recessed configuration if the user plans on stacking items on top of the container 100.

FIGS. 8-12 show perspective views of a second embodiment of an exemplary plastic wrap container 200 (hereinafter "container 200") in accordance with embodiments of the present disclosure. The container 200 can be substantially similar in structure and function to the container 100, except for the distinctions noted herein. Therefore, like reference numbers represent like structures. The container 200 includes a cutter assembly 140 attached to the second surface 124 of the recessed area 120. The container 200 also does not include the perforated section 146 on the first and second side walls 126, 128. Thus, the cutter assembly 140 can be used while the recessed area 120 is in the recessed configuration.

Rather than including a perforated section 136 extending across a single wall of the container 100, the container 200 includes a perforated section 202 extending across two walls (e.g., the top wall 108 and the first surface 122 of the recessed area 120). Thus, a portion of the perforated section 202 extends across the top wall 108, over an edge 206 separating the top wall 108 and the first surface 122, and further extends on a portion of the first surface 122. Although FIGS. 8-12 show the perforated section 136 extending on or down a portion of the first surface 122, the perforated section 136 can extend down the first surface 122 by any distance, including all the way to second surface 124. When removed from the body 102, the perforated section 136 forms an opening 204 extending across the top wall 108, the edge 206 and the first surface 122.

Figure 10:
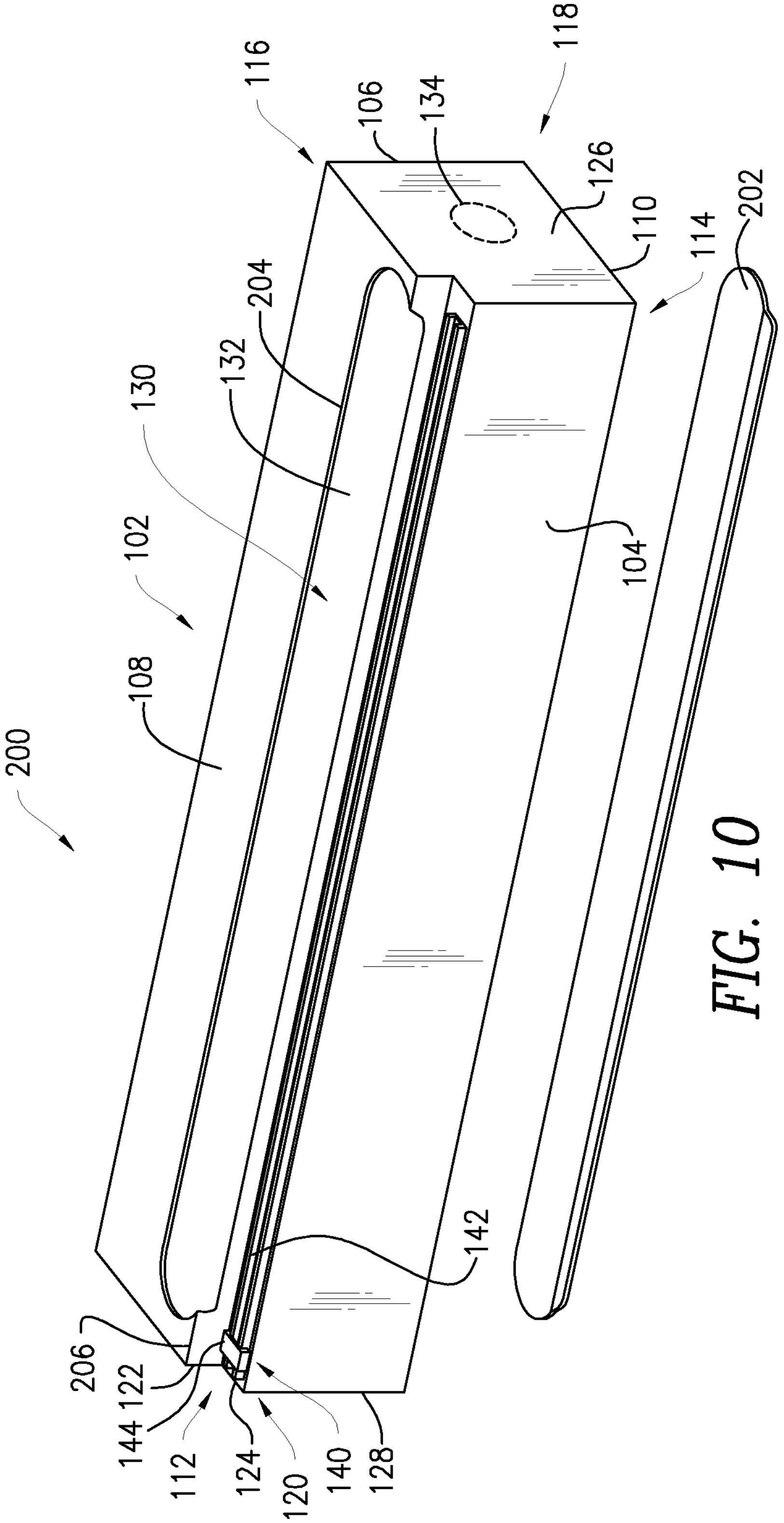
FIG. 10 is a perspective view of an exemplary plastic wrap container of FIG. 8 including a recessed area in a recessed configuration and a fully removed perforated section.
Figure 11:
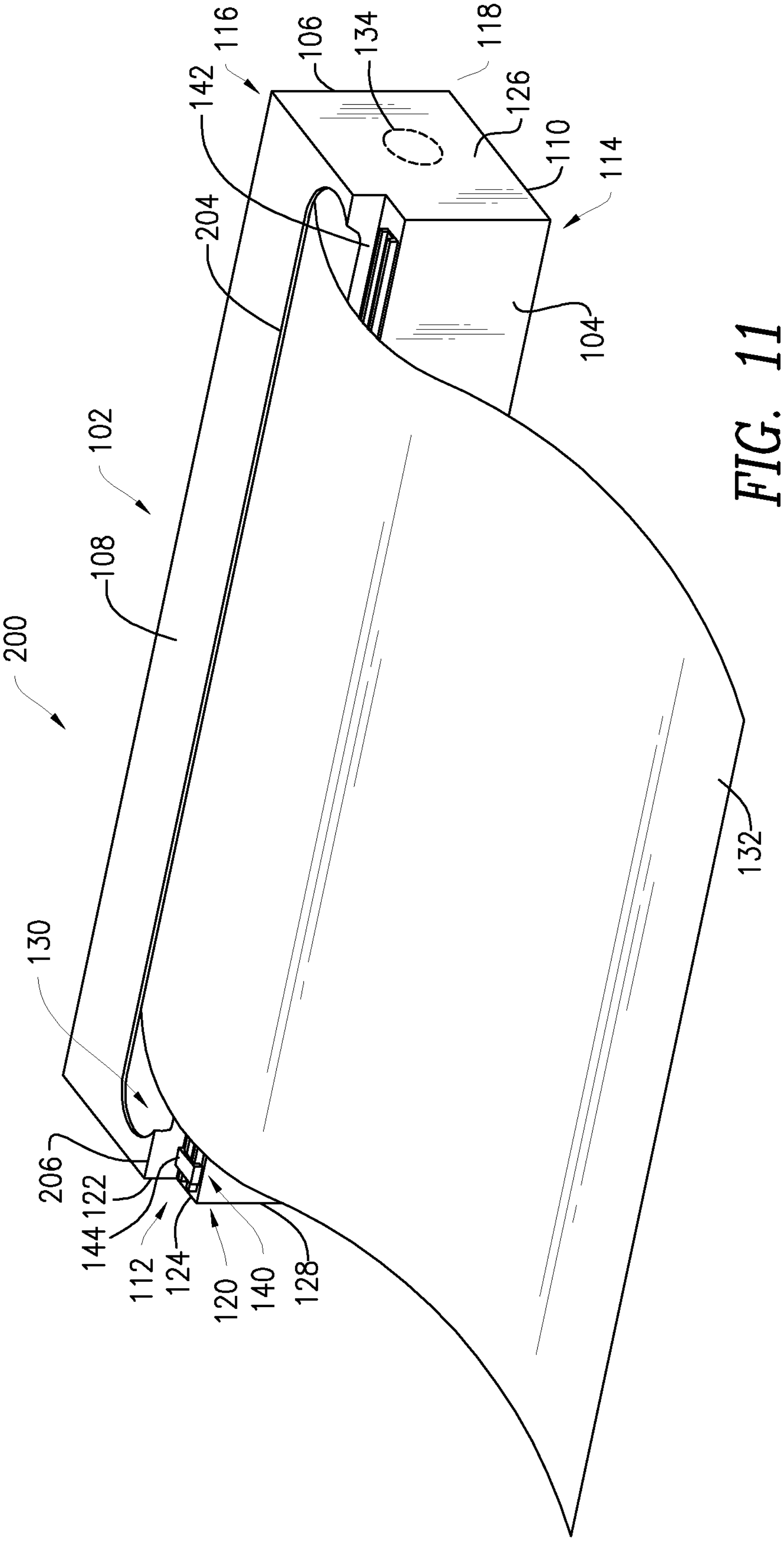
FIG. 11 is a perspective view of an exemplary plastic wrap container of FIG. 8 including a recessed area in a recessed configuration and plastic wrap dispensed from an opening.
Figure 12:
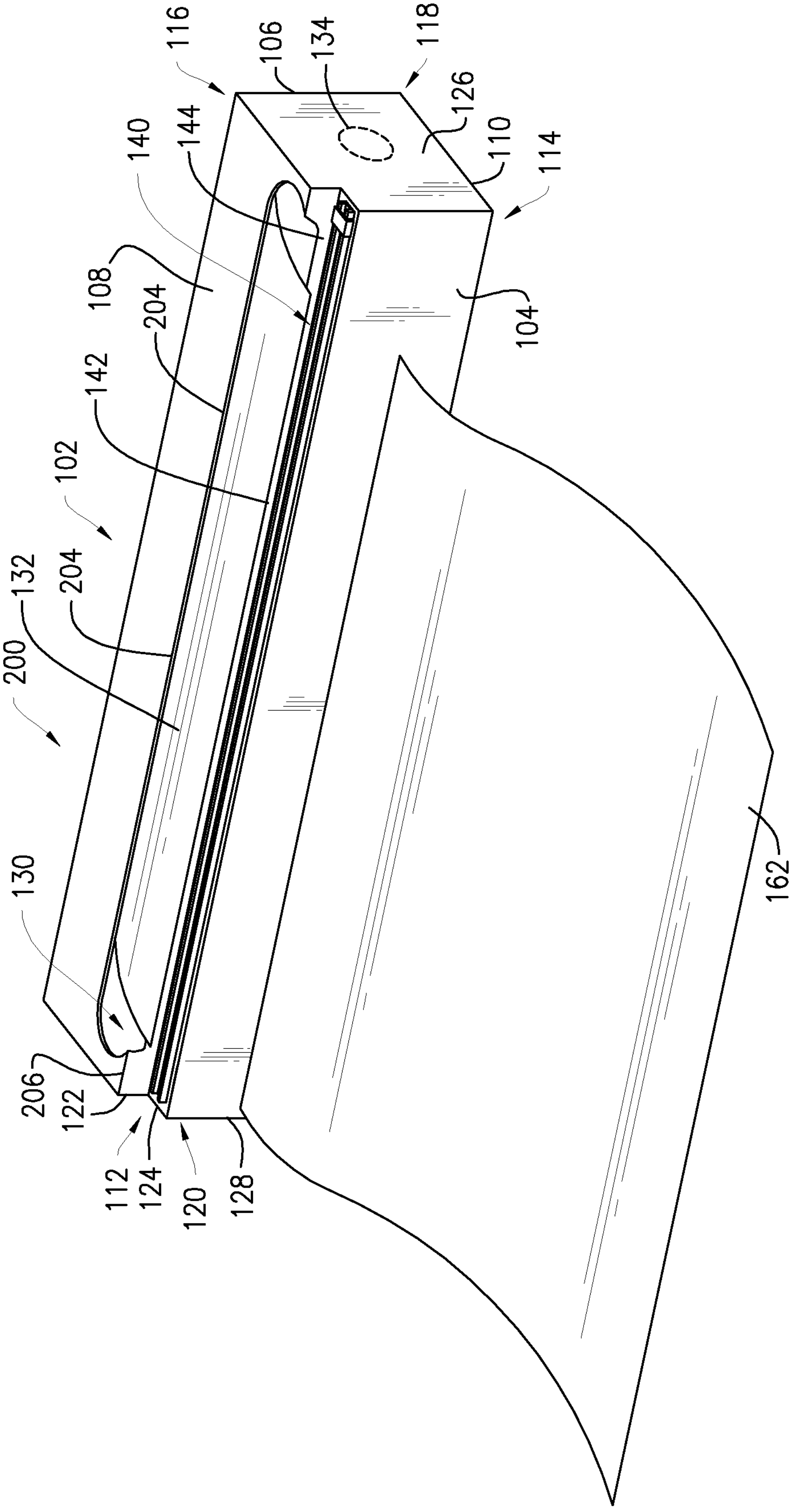
FIG. 12 is a perspective view of an exemplary plastic wrap container of FIG. 8 including a recessed area in a recessed configuration, plastic wrap dispensed from an opening, and a section of the plastic wrap cut by a cutter assembly.

As shown in FIGS. 10-12, the perforated section 202 can be fully removed from the body 102 to expose the opening 204, and the plastic wrap 132 can be extended from the opening 204 and over the track 142 of the cutter assembly 140. In particular, with the recessed area 120 positioned in the recessed configuration and the cutter assembly 140 attached to the second surface 124, the sheet of plastic wrap 132 can be extended directly over the cutter assembly 140. The cutter 144 can be used to sever the individual sheet 162 of plastic wrap from the remaining roll of plastic wrap 132. The recessed configuration of the recessed area 120 maintains the cutter assembly 140 in a protected area from items stacked on the container 200, while allowing the user of the cutter assembly 140 without repositioning the recessed area 120 into the extended configuration.

Figure 13:
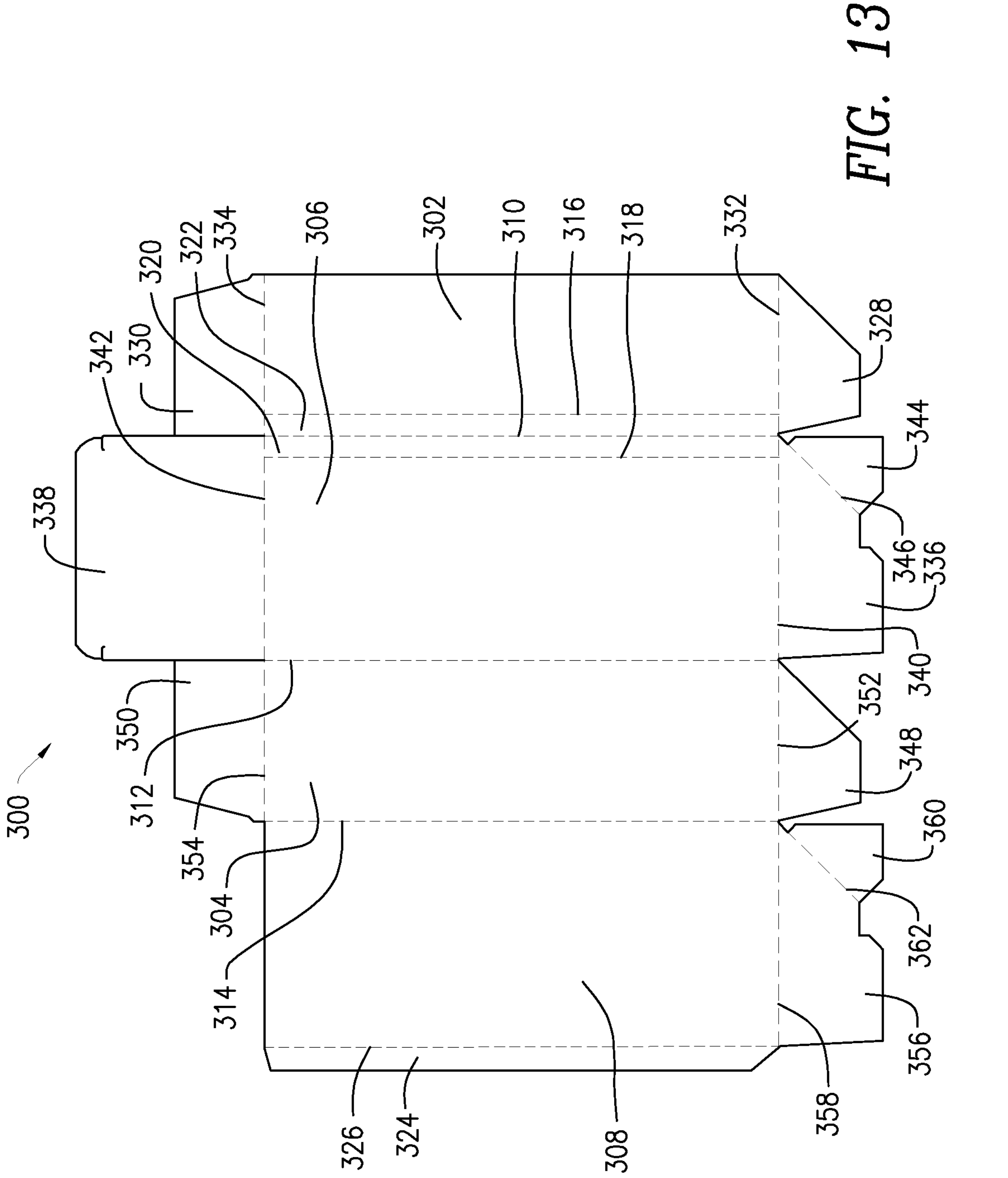
FIG. 13 is a top view of an exemplary blank for forming plastic wrap containers according to the present disclosure.

FIG. 13 is a top view of an exemplary blank 300 for forming plastic wrap containers (such as the plastic wrap container 100, 200). The blank 300 can be formed from a cardboard material and defines a substantially planar configuration prior to folding. The blank 300 generally includes a front wall portion 302, a rear wall portion 304, a top wall portion 306, and a bottom wall portion 308, with perforated or fold lines 310, 312, 314 separating the respective wall portions. Although FIG. 13 shows the width of the top wall portion 308 and the bottom wall portion 310 dimensioned greater than the width of the front wall portion 302 and the rear wall portion 304 (resulting in a substantially rectangular side profile of the folded container), in some embodiments such as the containers 100, 200, the wall portions 302-308 can have widths of equal dimensions to form a substantially rectangular side profile of the folded container.

The blank 300 includes perforated or fold line 316, 318 formed adjacent to and on opposite sides of the fold line 310. In particular, fold line 316 can be formed in the front wall portion 302 and the fold line 318 can be formed in the top wall portion 306. In the folded configuration, the fold lines 316, 318 assist in forming the first and second surfaces 122, 124 of the recessed area 120. Thus, the area between the fold line 310 and the fold line 318 can be designated as the first surface portion 320, and the area between the fold line 310 and the fold line 316 can be designated as the second surface portion 322. The blank 300 can include an end portion 324 extending from the bottom wall portion 308, and connected to the bottom wall portion 308 at a perforated or fold line 326. When partially folded, the end portion 324 can be secured to the inner surface of the front wall portion 302 by, e.g., adhesive, to maintain the blank 300 in the folded configuration.

The front wall portion 302 can include side flaps 328, 330 attached to the front wall portion 302 by perforated or fold lines 332, 334. The top wall portion 306 can include side flaps 336, 338 attached to the top wall portion 306 by perforated or fold lines 340, 342. The side flap 336 can include an extension flap 344 connected to the side flap 336 by a perforated or fold line 346. The extension flap 334 can be configured to fold and be secured to the inner surface of the side flap 328 with, e.g., adhesive. The rear wall portion 304 can include side flaps 348, 350 attached to the rear wall portion 304 by perforated or fold lines 352, 354. The bottom wall portion 308 can include a side flap 356 attached to the bottom wall portion 308 by a perforated or fold line 358. The side flap 356 can include an extension flap 360 connected to the side flap 356 by a perforated or fold line 362. The extension flap 360 can be configured to fold and be secured to the inner surface of the side flap 348 with, e.g., adhesive.

In the folded configuration, the side flaps of the blank 300 can form the first and second side walls 126, 128 of the container 100, 200. In some embodiments, the side flap 328 defines a different configuration from the side flap 330, and further defines the same configuration as the side flap 348. The side flap 348 similarly defines a different configuration from the side flap 350. In some embodiments, the side flaps 330, 350 can define mirror images of each other. In some embodiments, the side flap 336 can define the same configuration as the side flap 356. The side flap 336 can define a different configuration from the side flap 338. The blank 300 can be folded to form the exemplary containers 100, 200 discussed herein. The cutter assembly 140 can be attached to the blank 300 after at least a portion of the blank 300 has been folded, thereby preventing the cutter assembly 140 from being damaged or disengaged from the blank 300 during the folding process.

Figure 14:
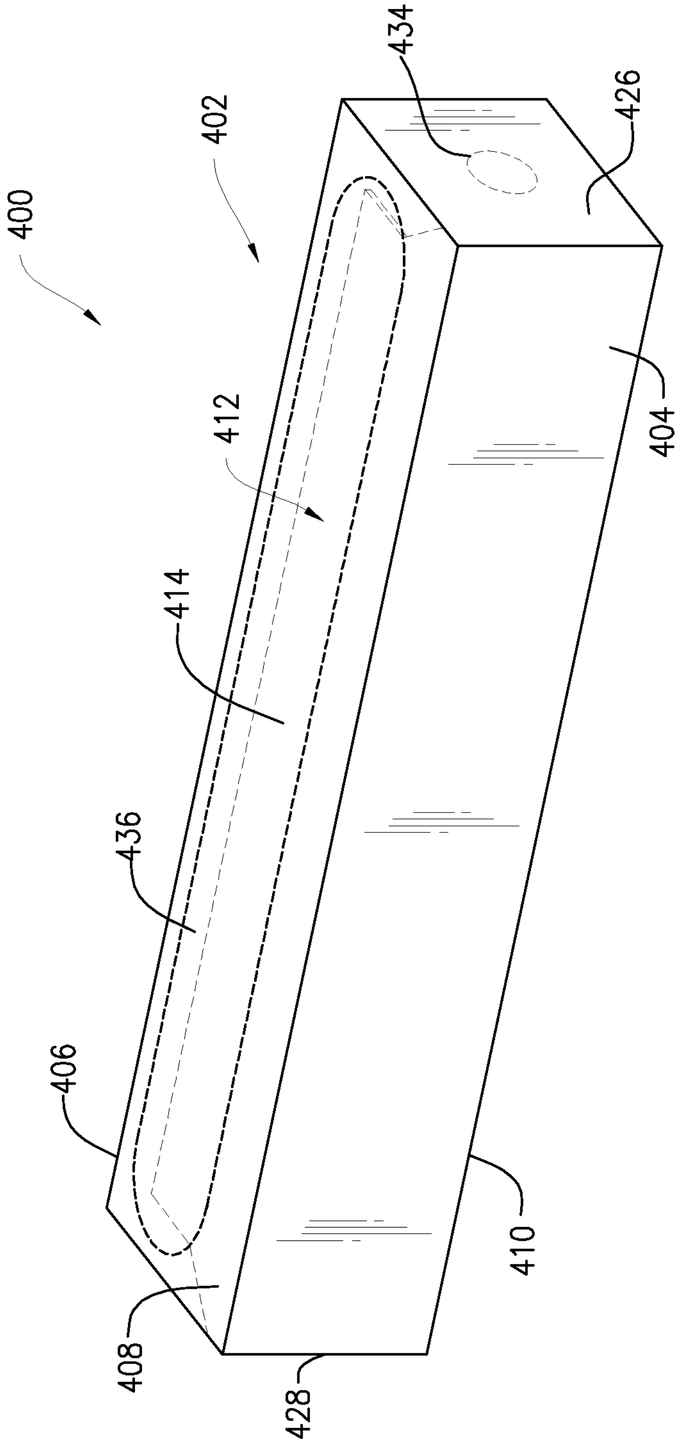
FIG. 14 is a perspective view of another embodiment of an exemplary plastic wrap container according to the present disclosure.

Turning to FIG. 14, a perspective view of another embodiment of an exemplary plastic wrap container 400 (hereinafter "container 400") is provided. The container 400 includes a body 402 including a front wall 404, a rear wall 406, a top wall 408 and a bottom wall 410. Although illustrated as having four walls forming a rectangular housing having a substantially square cross-section (perpendicular to the four walls), it should be understood that the four walls can form a rectangular cross-section, or the body 402 can include more than four walls. The body 402 can be formed from a blank (e.g., a continuous piece of material) having multiple perforated lines or fold lines for folding the blank into the configuration shown in FIG. 14. The blank (see, e.g., FIG. 13) could be formed from a cardboard material and could have a substantially planar configuration prior to folding.

The body 402 includes first and second side walls 426, 428 each connected to side edges of the front, rear, top and bottom walls 404-410 to define a plurality of lateral corners on opposing sides of the body 402. The connection between the first and second side walls 426, 428 and the front, rear, top and bottom walls 404-410 define a substantially right angle. The front, rear, top and bottom walls 404-410 and the first and second side walls 426, 428 form an enclosure 430 within the body 402 configured and dimensioned to receive a roll of plastic wrap 432 (see, e.g., FIG. 15). An inner surface of the first and second side walls 426, 428 can include a feature 434 (feature on second side wall 428 not visible) for maintaining the position of the plastic roller. For example, in one embodiment, the feature 434 can be in the form of a perforated or partially perforated section configured to be pushed into the enclosure 430 to maintain the position of the roll of plastic wrap 432 within the enclosure 430. The location of the feature 434 defines the approximate axis of rotation for the roll of plastic wrap 432. In another embodiment, the feature 434 can be in the form of an extension mounted to the inner surface of the first and second side walls 426, 428 configured to engage and maintain the position of the roll of plastic wrap 432 within the enclosure 430.

The container 400 includes a perforated section 436 (e.g., an elongated section with a preperforated perimeter) formed in and extending along a partial length of one of the walls of the body 402 (e.g., the top wall 408). The perforated section 436 can be configured to be at least partially separated from the top wall 408 to form an opening 438 (see, e.g., FIG. 15) for dispensing the plastic wrap 432 from the enclosure 430 (see, e.g., FIG. 19). The container also includes a folding section 412 having a top surface 414 and a bottom surface 416 (see, e.g., FIG. 18). The container 400 further includes a cutter assembly 440 attached to the body 402. In the embodiment shown in FIG. 14, the cutter assembly 440 (not shown) is attached to the bottom surface 416 of the folding section 412 (see, e.g., FIG. 18).

Figure 16:
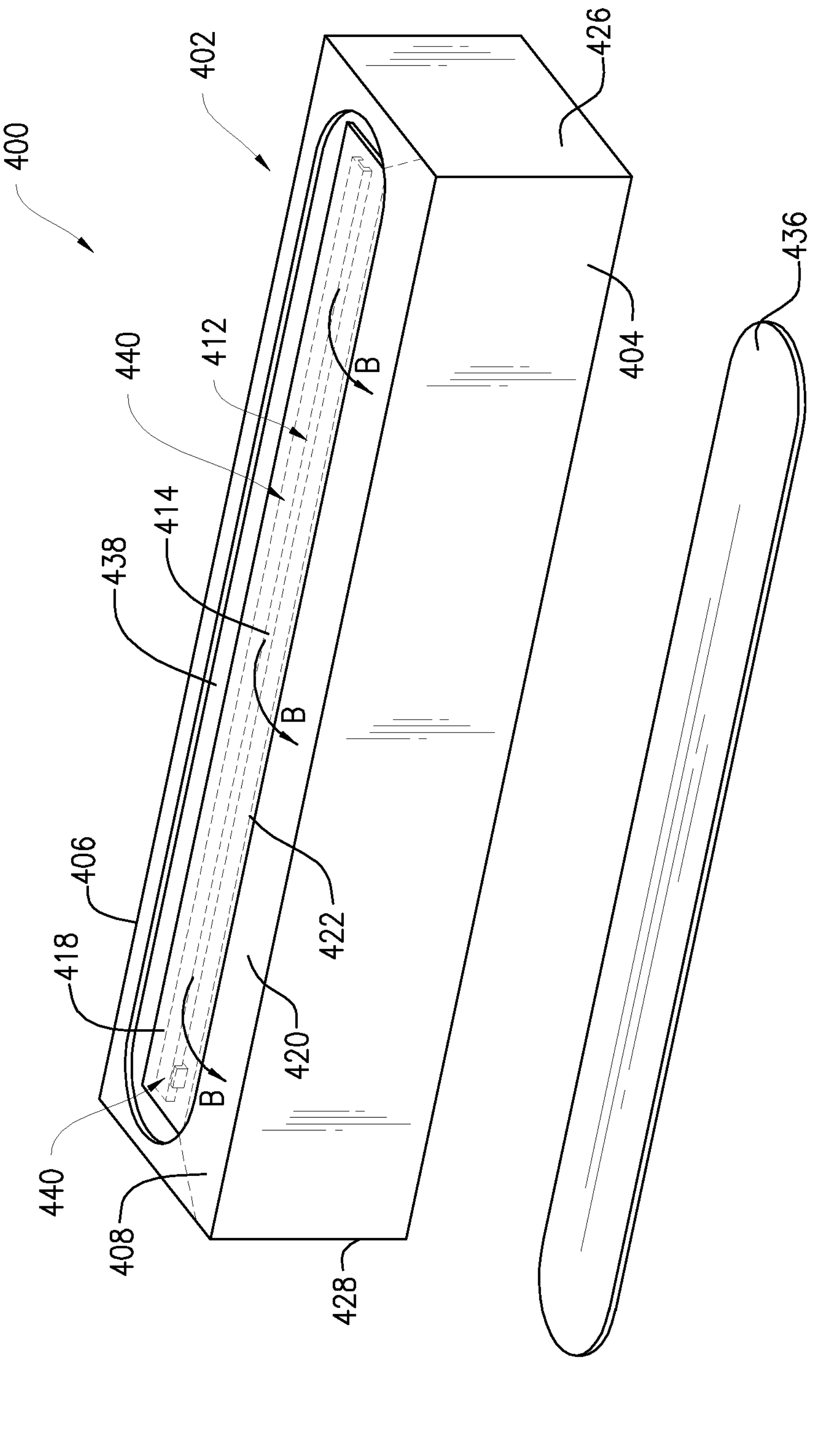
FIG. 16 is a perspective view of an exemplary plastic wrap container of FIG. 14 including a completely removed perforated section.
Figure 17:
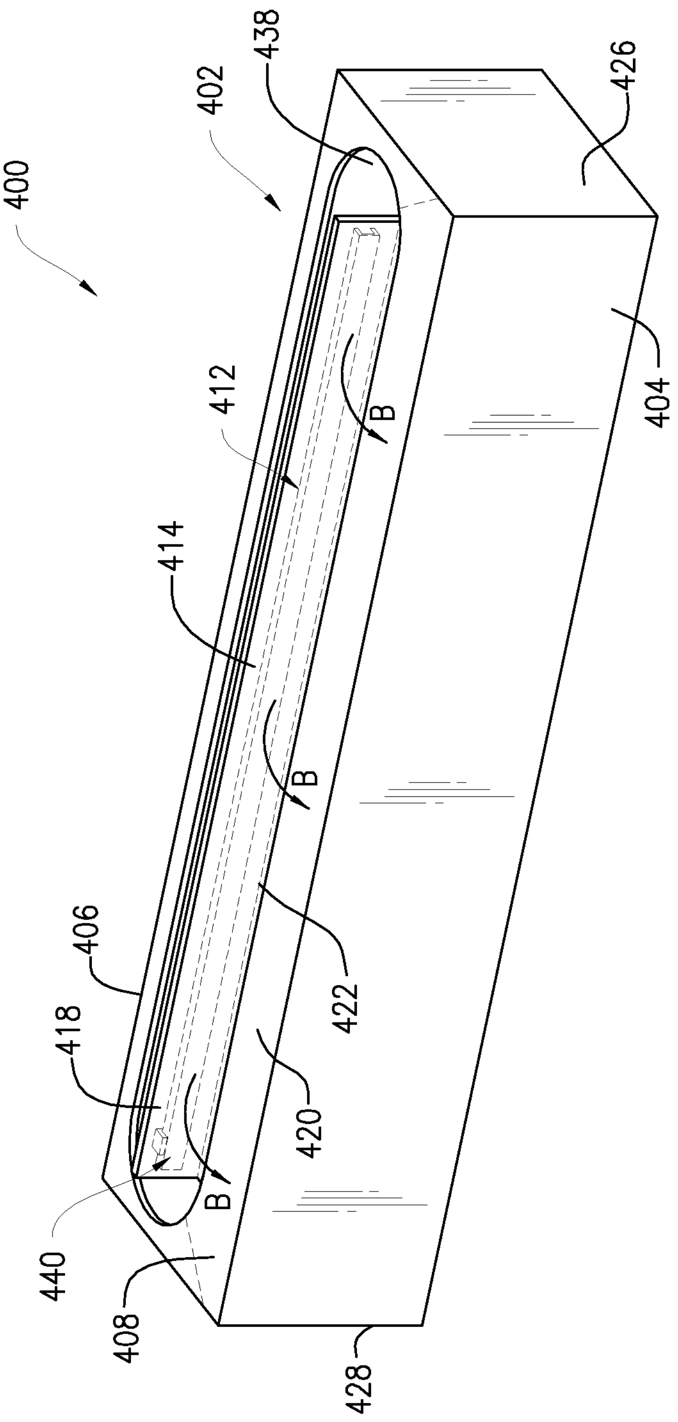
FIG. 17 is a perspective view of an exemplary plastic wrap container of FIG. 14 showing a folding section.
Figure 18:
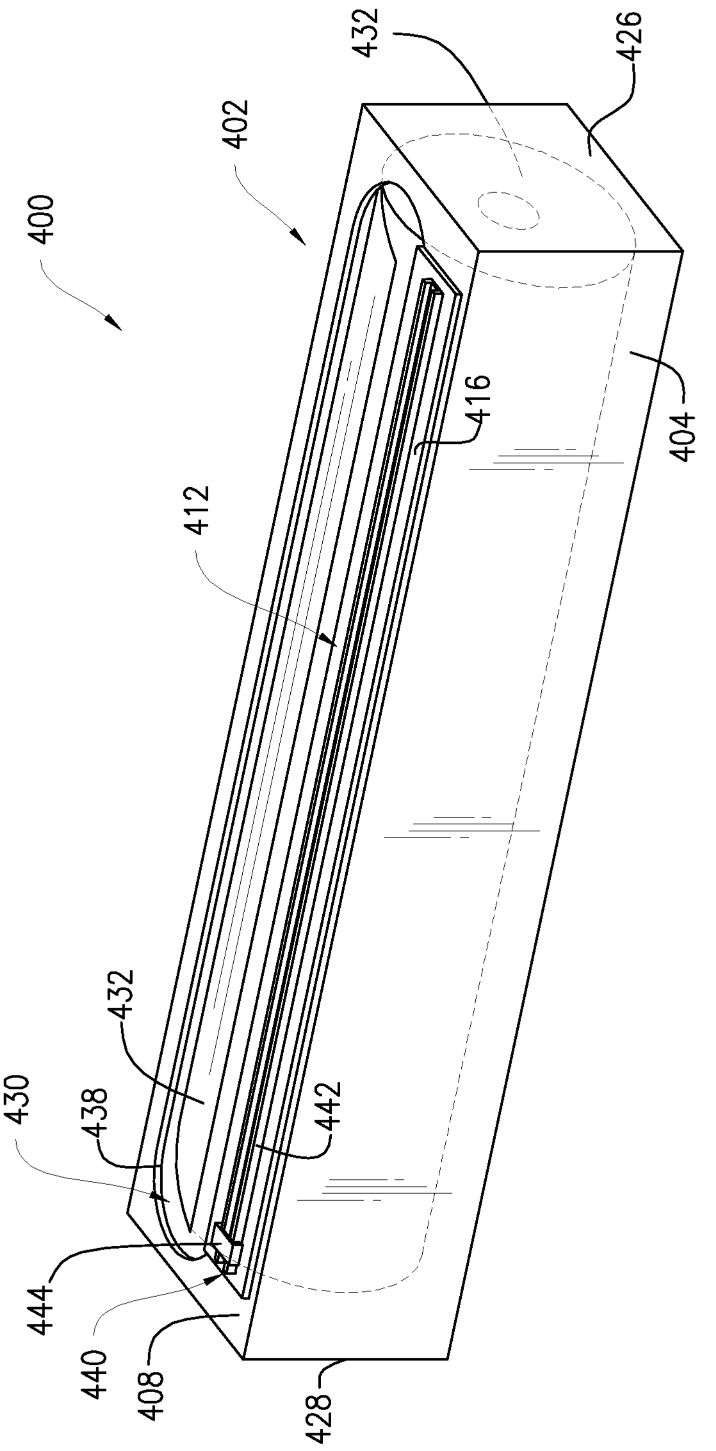
FIG. 18 is a perspective view of an exemplary plastic wrap container of FIG. 14 including a cutter assembly in a deployed configuration.

As shown in FIGS. 14-18 the cutter assembly 440 can be positioned in a retracted configuration (see, e.g., FIG. 14) and a deployed configuration (see, e.g., FIG. 18). In the retracted configuration the cutter assembly 440 is positioned within the enclosure 430, thereby protecting the cutter assembly from damage during shipping or storage of the container 400. In particular, the container 400 is configured such that when the cutter assembly 440 is positioned in the retracted configuration, the container 400 is bound by the planes defined by walls 404-410. Due to the recessed positioning of the cutter assembly 140 in the retracted configuration, multiple containers 400 can be stacked relative to each other without imparting pressure or force on the cutter assembly 440, thereby preventing potential damage to the cutter assembly 440.

Figure 15:
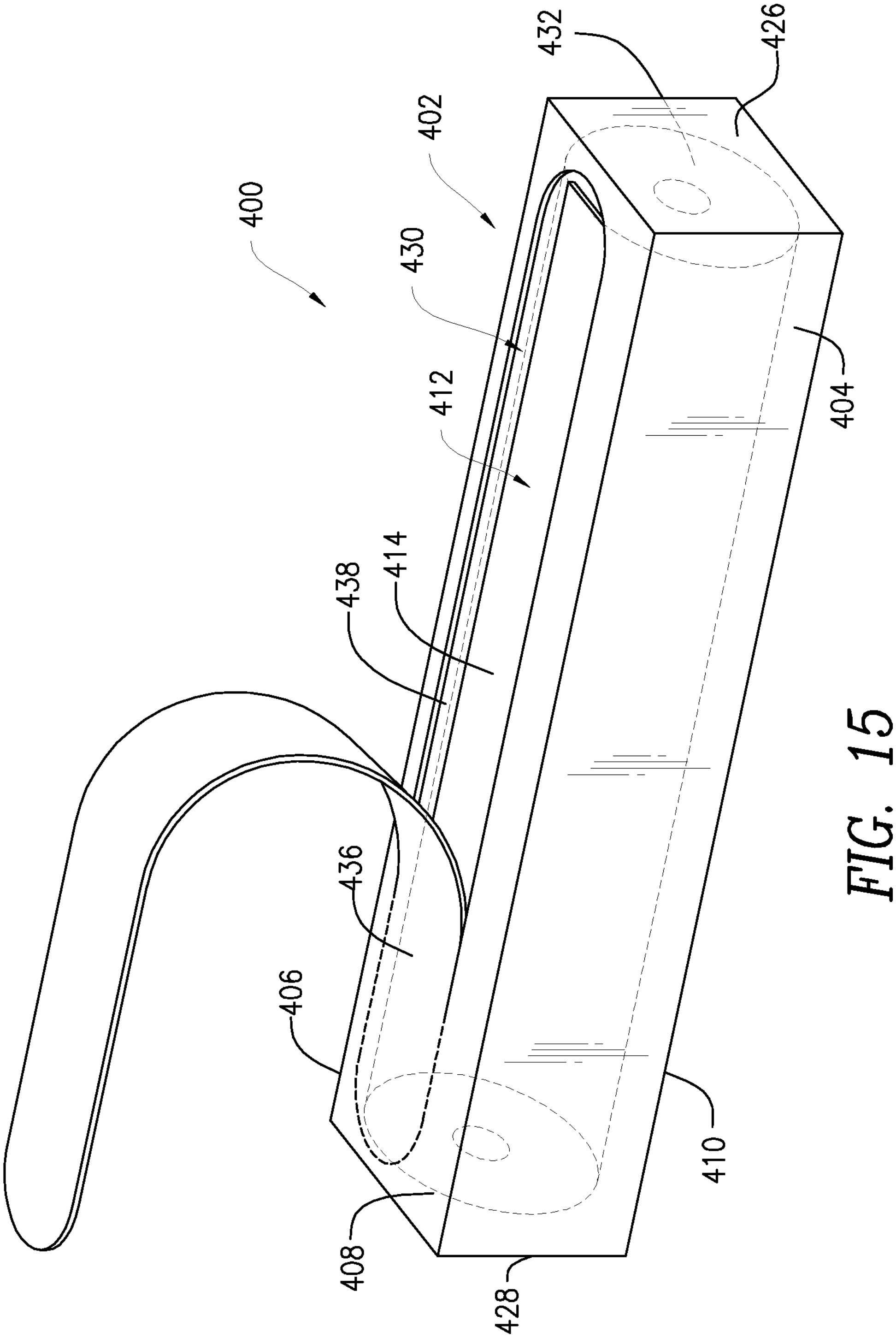
FIG. 15 is a perspective view of an exemplary plastic wrap container of FIG. 14 including a partially removed perforated section.

FIGS. 15-18 are perspective views of the container 400 illustrating deployment of the cutter assembly 440. FIG. 15 is a perspective view of the container 400 with the perforated section 436 partially removed. The perforated section 436 can be at least partially removed by the user (e.g., cut or punched out, torn the enclosure 430, or the like) to form the opening 438 in the top wall 408 of the container 400. As shown in FIG. 15, removal of perforated section 436 revels the folding section 412. In the embodiment of FIG. 15, the opening 438 formed by removing perforated section 436 is sized such that folding section 412 can pass therethrough. Although the embodiment shown in FIG. 15 illustrates the perforated section 436 defining a opening 436 that is bounded on all sides by top wall 408, it is within the scope of this disclosure that the opening 438 need not be bounded on all sides by top wall 408. For example, opening 438 could extend to, one or more of, front wall 404, rear wall 406, side wall 426, and side wall 428.

FIGS. 16 and 17 are perspective views of the container 400 with the perforated section 436 completely removed. As shown in FIGS. 16 and 17, the user can, for example, urge or bend a first portion 418 of folding section 412 about a fold line 422 (e.g., a perforated or scored line) as indicated by arrows B, thereby rotating the first portion 418 out through the opening 438 and positioning the cutter assembly 440 into the deployed configuration (see, e.g., FIG. 18). Further, although illustrated as fully removed in FIGS. 16-21B, in some embodiments, one end of the perforated section 436 can remain attached to the top wall 408 and acts as a flap used to close the opening 438 after the desired plastic wrap 432 has been dispensed.

FIG. 18 is a perspective view of the container 400 with the perforated section completely removed and the cutter assembly 440 fully positioned into the deployed configuration, thereby allowing for extension of the plastic wrap 432 through the opening 438. As shown in FIG. 18, the cutter assembly 440 includes an elongated track 442 and a slidable cutter 444 with an internal blade or serrated edge. The track 442 can be attached to the bottom surface 416 of the folding section 412 with adhesive or by welding, and the slidable cutter 444 travels along the track 442 to cut the plastic wrap 432 positioned over the track 442 (see, e.g., FIGS. 19 and 20). In the embodiment shown in FIG. 18, the folding section 412 and cutter assembly 440 are positioned flat against top wall 408. Adhesive or tabs (not shown) could be used to permanently or removably affix or adhere the folding section 412 to top wall 408 (e.g., in the deployed configuration). Accordingly, the user could position the cutter assembly 440 in the deployed configuration when the container 400 is being used to dispense plastic wrap 432, and then leave the cutter in a deployed configuration, or then return the cutter assembly 440 to the retracted configuration for storage so as to not risk undue damage the cutter assembly 440. Further, as described hereinabove, in some embodiments, one end of the perforated section 436 can remain attached to the top wall 408 and acts as a flap used to close the opening 438 after the desired plastic wrap 432 has been dispensed. Accordingly, after the user returns the cutter assembly 440 to the retracted configuration, the user could further return the perforated section 436 to its original position, thereby providing additional protection for the cutter assembly 440 and also preventing debris or particulate from entering the enclosure 430.

Figure 19:
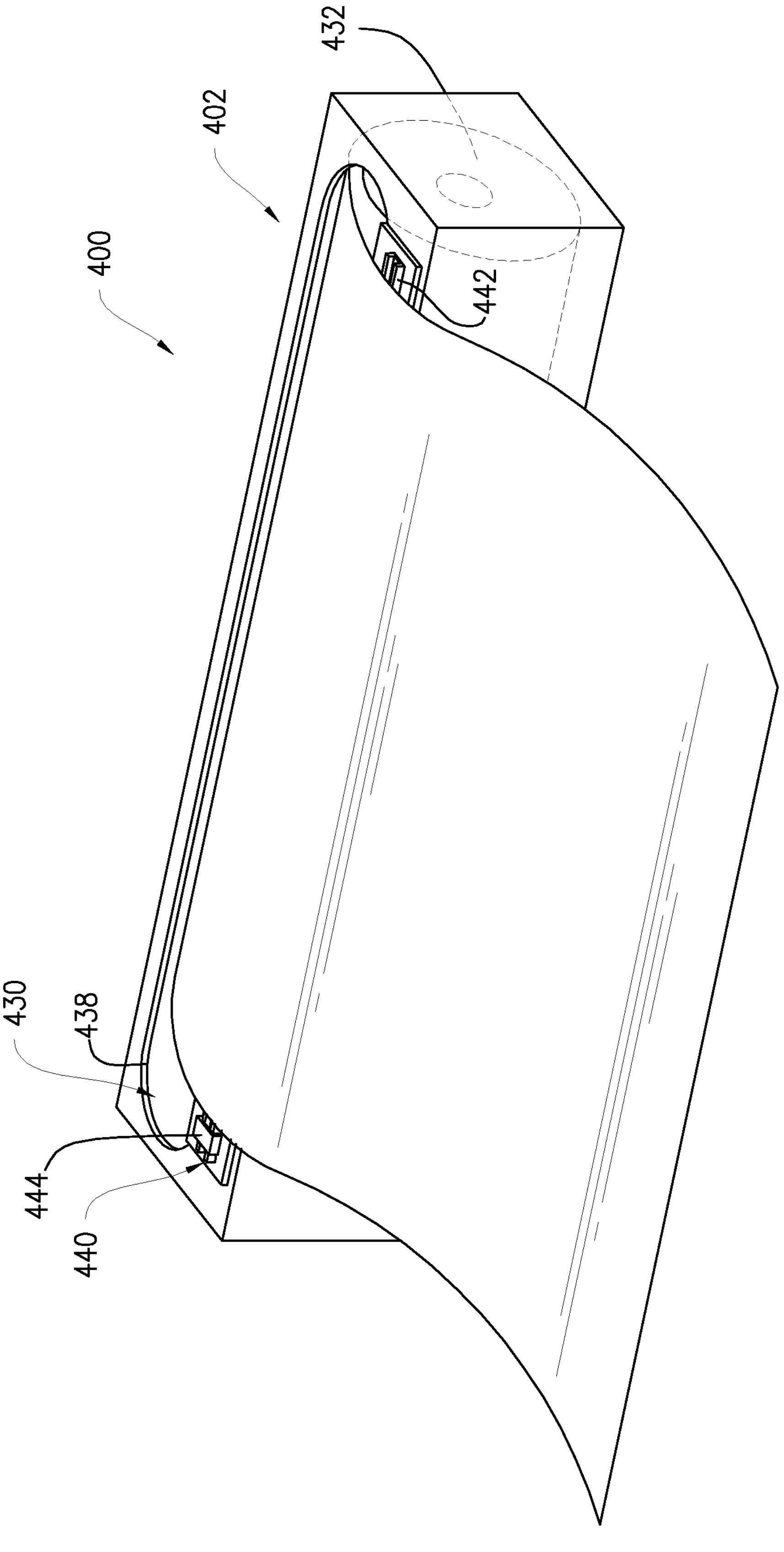
FIG. 19 is a perspective view of an exemplary plastic wrap container of FIG. 14 including a cutter assembly in a deployed configuration and plastic wrap dispensed from an opening.
Figure 20:
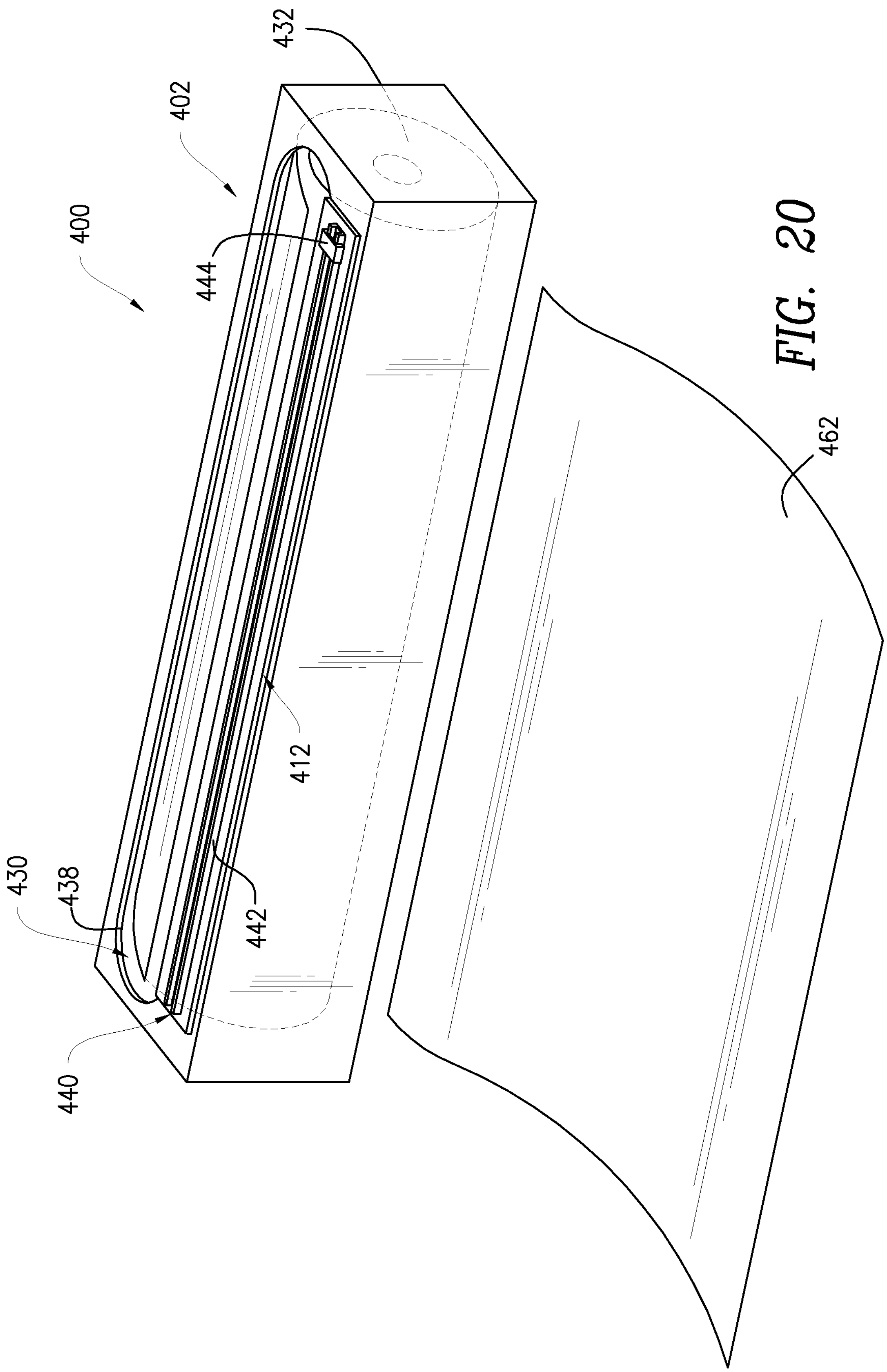
FIG. 20 is a perspective view of an exemplary plastic wrap container of FIG. 14 including a cutter assembly in a deployed configuration and plastic wrap dispensed from an opening, and a section of the plastic wrap cut by a cutter assembly.

FIGS. 19 and 20 show perspective views of the container 400 with the perforated section completely removed and the cutter assembly 440 fully positioned into the deployed configuration, thereby allowing for extension of the plastic wrap 432 through the opening 438. After the perforated section 436 has been removed, the end of the plastic wrap 432 can be dispensed through the opening 438 until the desired length of the plastic wrap 432 is achieved. The plastic wrap 432 can be positioned over the track 442 of the cutter assembly 440 as shown in FIG. 19, and the cutter 444 can be slid across the track 442 to sever an individual sheet of plastic wrap 462 from the remaining plastic wrap 432 (see, e.g., FIG. 20). After use of the container 400, the cutter assembly 440 can remain in the deployed configuration or can be repositioned into the retracted configuration if the user plans on storing or stacking items on top of the container 400.

Figure 21A:
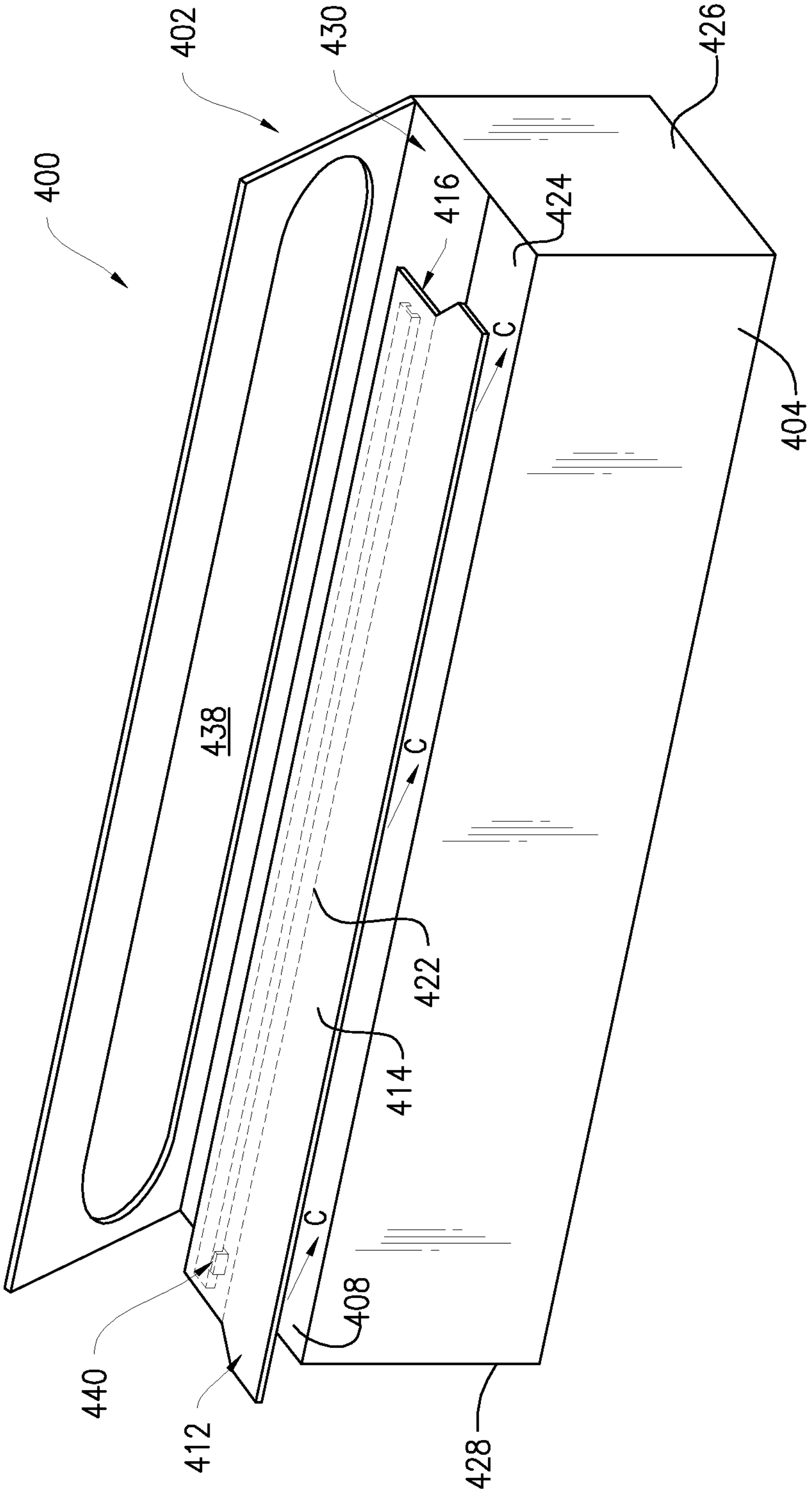
FIG. 21A is a perspective view of an exemplary plastic wrap container of FIG. 14 showing a detached folding section.
Figure 21B:
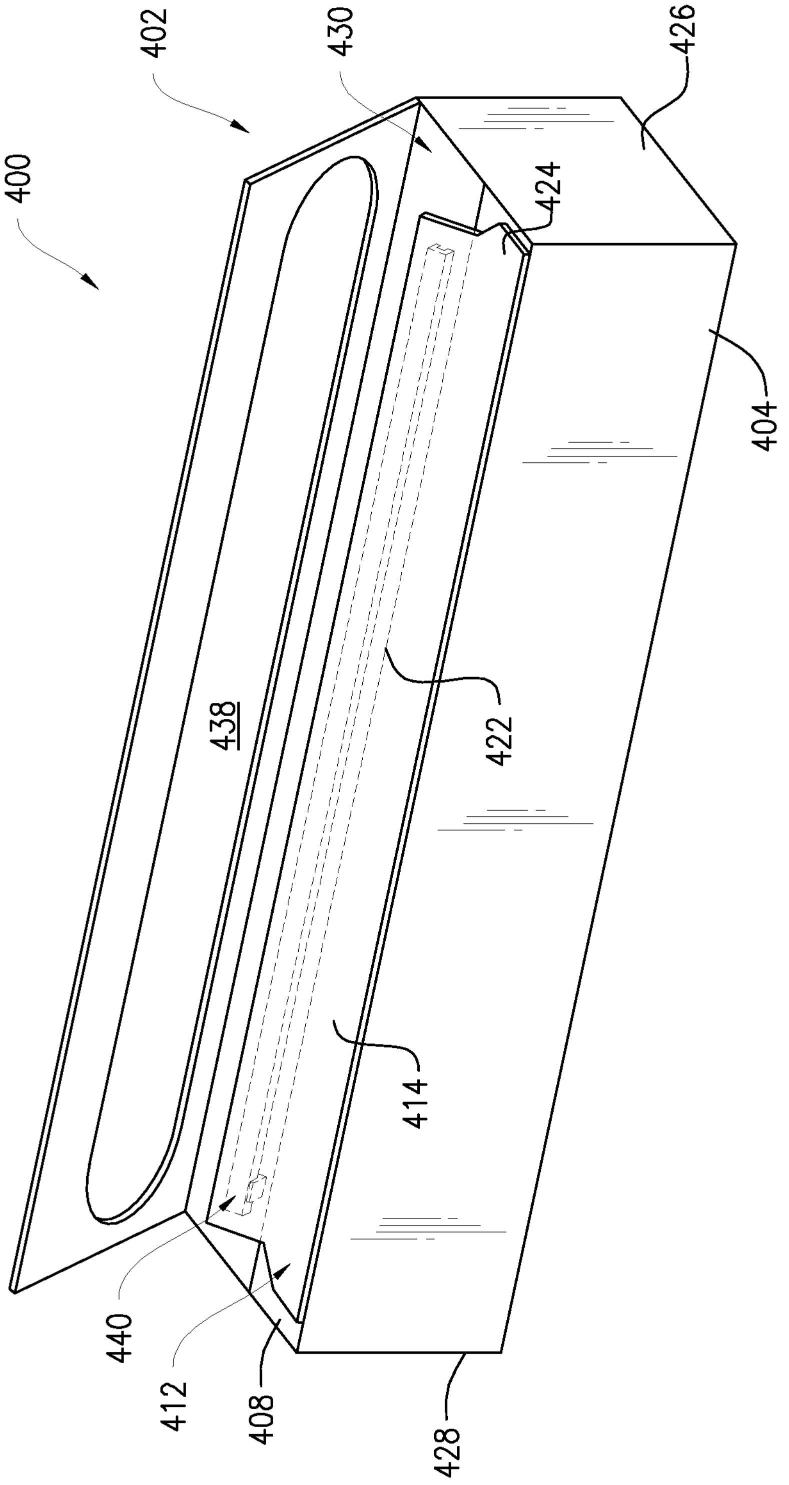
FIG. 21B is a perspective view of an exemplary plastic wrap container of FIG. 14 showing the folding section attached to an upper support wall.

FIGS. 21A and 21B are perspective views of the container 400 illustrating attachment of the folding section 412 to the body 402 of the container 400. In particular, in the embodiment illustrated in FIGS. 21A and 21B, the folding section 412 is attached to an upper support wall 424 as indicated by arrows C. The folding section 412 can be attached to the upper support wall with adhesive, by welding, or using any other attachment means known to those of ordinary skill in the art. Although FIGS. 21A and 21B show the folding section 412 attached to an upper surface of the upper support wall 424 (e.g., the bottom surface 416 of the folding section 412 contacting the upper support wall 424), it is within the scope of the current disclosure that the folding section 412 can also be attached to an underside of the upper support wall 424 (e.g., the top surface 414 of the folding section 412 contacting the upper support wall 424). It is within the scope of the present disclosure that container 400 could be provided to the user with the folding section 412 already attached to upper support wall 424, or the container 400 could be provided to the user without the folding section 412 attached. If the container 400 is provided to the user without the folding section 412 already attached, instructions could be provided with the container 400 detailing the procedure for attaching the folding section 412.

Figure 22:
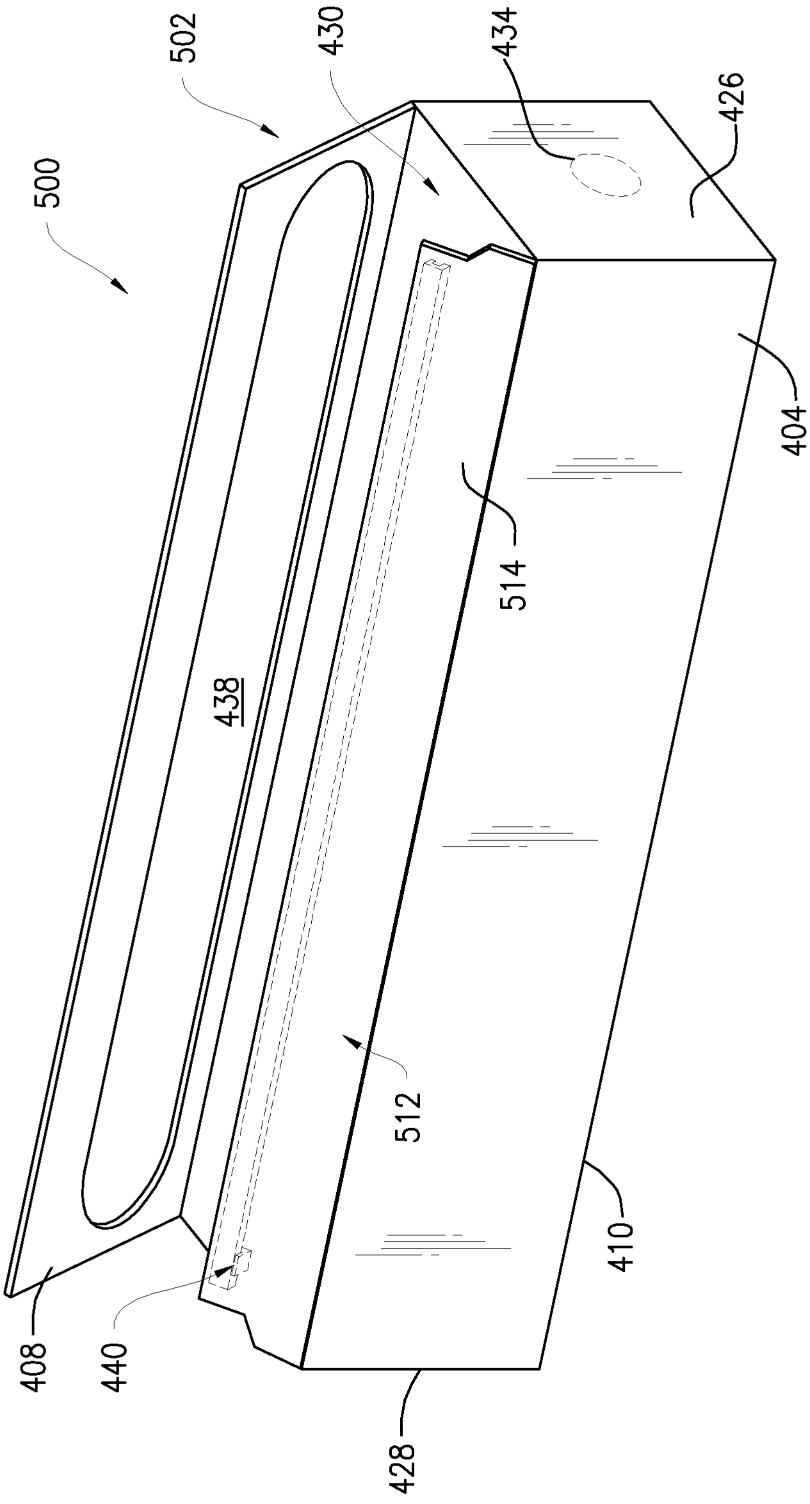
FIG. 22 is a perspective view of a another embodiment of an exemplary plastic wrap container including an integral folding section according to the present disclosure.

FIG. 22 shows a perspective view of a second embodiment of an exemplary plastic wrap container 500 (hereinafter "container 500") in accordance with embodiments of the present disclosure. The container 500 can be substantially similar in structure and function to the container 400, except for the distinctions noted herein. Therefore, like reference numbers represent like structures.

The container 500 includes a body 502 including a front wall 404, a rear wall 406 (not shown), a top wall 408 and a bottom wall 410. The body 502 can be formed from a blank (e.g., a continuous piece of material) having multiple perforated lines or fold lines for folding the blank into the configuration shown in FIG. 14. The blank (see, e.g., FIG. 13) could be formed from a cardboard material and define a substantially planar configuration prior to folding. Notably, the blank for the container 500 includes a folding section 512 formed integrally therewith, discussed in greater detail hereinbelow.

The body 502 includes first and second side walls 426, 428 each connected to side edges of the front, rear, top and bottom walls 404-410 to define a plurality of lateral corners on opposing sides of the body 502. The connection between the first and second side walls 426, 428 and the front, rear, top and bottom walls 404-410 define a substantially right angle. The front, rear, top and bottom walls 404-410 and the first and second side walls 426, 428 form an enclosure 430 within the body 502 configured and dimensioned to receive a roll of plastic wrap 432 (see, e.g., FIG. 15). An inner surface of the first and second side walls 426, 428 can include a feature 434 (feature on second side wall 428 not visible) for maintaining the position of the plastic roller. For example, in one embodiment, the feature 434 can be in the form of a perforated or partially perforated section configured to be pushed into the enclosure 430 to maintain the position of the roll of plastic wrap 432 within the enclosure 430. The location of the feature 434 defines the approximate axis of rotation for the roll of plastic wrap 432. In another embodiment, the feature 434 can be in the form of an extension mounted to the inner surface of the first and second side walls 426, 428 configured to engage and maintain the position of the roll of plastic wrap 432 within the enclosure 430.

The container 500 includes a perforated section (not shown) formed in and extending along a partial length of one of the walls of the body 502 (e.g., the top wall 408). The opening 438 provides for dispensing the plastic wrap 432 from the enclosure 430. The container also includes a folding section 512 having a top surface 514 and a bottom surface (not shown). The container 500 includes a cutter assembly 440 attached to the bottom surface of the folding section 512. In the embodiment shown in FIG. 22, the folding section 512 is integrally formed with at least the front wall 504. Similar to the embodiments shown in FIGS. 14-18, the cutter assembly 440 is positioned in a retracted configuration and then deployed for use. In the retracted configuration the cutter assembly 440 is positioned within the enclosure 430, thereby protecting the cutter assembly from damage during shipping or storage of the container 500. In particular, the container 500 is configured such that when the cutter assembly 440 is positioned in the retracted configuration, the container 500 is bound by the planes defined by walls 404-410. Due to the recessed positioning of the cutter assembly 440 in the retracted configuration, multiple containers 500 can be stacked relative to each other without imparting pressure or force on the cutter assembly 440, thereby preventing potential damage to the cutter assembly 440.

With particular reference to FIGS. 14-21B, the present disclosure also relates a method for positioning the cutting assembly 440 into the deployed configuration. The method includes the following steps: at least partially removing the perforated section 436 from the top wall 408 of the body 402 of the container 400, thereby providing an opening or aperture 438 in the top wall 408 (see, e.g., FIG. 15); bending the first portion 418 of the folding section 412 about the fold line 422 as indicated by arrows B, thereby rotating the first portion 418 out through the opening 438 (see, e.g., FIGS. 16 and 17); and contacting the top surface 414 to the top wall 408, thereby positioning the cutting assembly 440 into the deployed configuration (see, e.g., FIG. 18). The method could also include the step of attaching the top surface 414 to the top wall 408 using an adhesive or tabs. The adhesive or tabs could be used to permanently or removably affix or adhere the folding section 412 to top wall 408 (e.g., in the deployed configuration). Accordingly, the user could position the cutter assembly 440 in the deployed configuration when the container 400 is being used to dispense plastic wrap 432 and then return the cutter assembly 440 to the retracted configuration for storage so as to not risk undue damage the cutter assembly 440. The method could also further include the following steps: dispensing the plastic wrap 432 through the opening 438 until the desired length of the plastic wrap 432 is achieved; positioning the plastic wrap 432 over the track 442 of the cutter assembly 440 (see, e.g., FIG. 19); and sliding the cutter 444 across the track 442 to sever the individual sheet of plastic wrap 462 from the remaining plastic wrap 432 (see, e.g., FIG. 20). The method could still further include the following steps: repositioning the cutter assembly into the retracted configuration; and repositioning the perforated section 436 into its original position.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A wrap container, comprising:
- a body including a front wall, a rear wall, a top wall, and a bottom wall forming an enclosure;
- a roll of wrap disposed within the enclosure;
- a perforated section on the top wall configured to be separated from the body to form an opening to withdraw wrap from the body;
- a folding section, under the perforated section, having a top surface and a bottom surface; and
- a cutter assembly including a track and a slidable cutter attached to the bottom surface of the folding section, the cutter assembly having a first retracted position in the enclosure and a second deployed position folded out of the opening when the folding section is folded out through the opening.

2. The wrap container of claim 1 further comprising perforated sections on side walls that can be pushed into the enclosure to maintain the position of the roll of wrap in the enclosure.

3. The wrap container of claim 1 further comprising adhesive on the folding section to affix the folding section to the top wall in a deployed position.

4. The wrap container of claim 3 wherein the adhesive is on the top surface of the folding section.

5. The wrap container of claim 3 further comprising adhesive on the container to affix the folding section to the top wall in a deployed position.

6. A wrap container, comprising:
- a body including a front wall, a rear wall, a top wall, and a bottom wall forming an enclosure;
- a roll of wrap disposed within the enclosure;
- a perforated section on the top wall configured to be partially separated from the body to form an opening to withdraw wrap from the body;
- a folding section, under the perforated section, having a top surface and a bottom surface; and
- a cutter assembly including a track and a slidable cutter attached to the bottom surface of the folding section, the cutter assembly having a first retracted position in the enclosure and a second deployed position folded out of the opening when the folding section is folded out through the opening.

7. The wrap container of claim 6 further comprising perforated sections on side walls that can be pushed into the enclosure to maintain the position of the roll of wrap in the enclosure.

8. The wrap container of claim 6 further comprising adhesive on the folding section to affix the folding section to the top wall in a deployed position.

9. The wrap container of claim 8 wherein the adhesive is on the top surface of the folding section.

10. The wrap container of claim 8 further comprising adhesive on the container to affix the folding section to the top wall in a deployed position.

11. The wrap container of claim 6 wherein the partially separated perforated section on the top wall is positioned in the opening after the folding section is in a deployed position.

12. A wrap container comprising:
- a body including a front wall, a rear wall, a top wall and a bottom wall forming an enclosure;
- a roll of wrap disposed within the enclosure;
- the top wall attached to the rear wall and having an opening to withdraw wrap from the body;
- a folding section attached to the front wall, the folding section having a top surface and a bottom surface;

the top wall overlying the folding section; and
- a cutter assembly including a track and a slideable cutter attached to the bottom surface of the folding section, the cutter assembly having a first retracted position in the enclosure and a second deployed position folded out of the opening when the folding section is folded out through the opening.

13. The wrap container of claim 12 wherein the top wall is movable with respect to the rear wall.

14. The wrap container of claim 12 wherein the cutter assembly has a first retracted position in the enclosure and a second deployed position folded out of the opening in the top wall.

* * * * *